United States Patent [19]
Konishi et al.

[11] Patent Number: 6,086,503
[45] Date of Patent: Jul. 11, 2000

[54] CAMERA

[75] Inventors: Yoshito Konishi; Hidehiko Fujii, both of Sakai; Junichi Tanii, Izumi; Nobuharu Murashima, Nara, all of Japan

[73] Assignee: Minolta Co., Ltd., Osaka, Japan

[21] Appl. No.: 09/057,480

[22] Filed: Apr. 9, 1998

Related U.S. Application Data

[62] Division of application No. 08/790,618, Jan. 29, 1997, Pat. No. 5,812,890.

[30] Foreign Application Priority Data

| Jan. 31, 1996 | [JP] | Japan | 8-015055 |
| Jan. 31, 1996 | [JP] | Japan | 8-016054 |
| Jan. 31, 1996 | [JP] | Japan | 8-016056 |
| Jan. 31, 1996 | [JP] | Japan | 8-016057 |
| Jan. 31, 1996 | [JP] | Japan | 8-016058 |
| Jan. 31, 1996 | [JP] | Japan | 8-016171 |

[51] Int. Cl.$^7$ ............................................. F16H 1/28
[52] U.S. Cl. ........................ 475/346; 475/162; 475/14
[58] Field of Search ............................ 475/162, 169, 475/170, 331, 346, 14

[56] References Cited

U.S. PATENT DOCUMENTS

| 2,501,034 | 3/1950 | Derbyshire | 475/346 X |
| 3,080,775 | 3/1963 | Fritsch | 475/346 X |
| 4,363,547 | 12/1982 | Hashimoto et al. | 354/212 |
| 4,841,319 | 6/1989 | Hansen | 354/275 |
| 4,967,615 | 11/1990 | Mills | 475/346 X |
| 5,220,370 | 6/1993 | Hawai et al. | 354/173 |
| 5,220,371 | 6/1993 | Tanii et al. . | |
| 5,347,334 | 9/1994 | Smart et al. | 354/275 |
| 5,360,380 | 11/1994 | Nottle | 475/169 X |
| 5,432,573 | 7/1995 | Lawther et al. | 354/174 |
| 5,674,144 | 10/1997 | Wiley | 475/170 |
| 5,773,589 | 7/1998 | Futterer | 475/346 |

*Primary Examiner*—Khoi Q. Ta
*Attorney, Agent, or Firm*—McDermott, Will & Emery

[57] ABSTRACT

A cartridge holder being movable between a cartridge accommcodating position where it is concealed within a camera body and a projecting position where it is exposed outside the camera body has a lower supporting member at its bottom for driving a film spool in a film cartridge inserted through an opening into the cartridge holder by engaging a lower end of the film spool, and an upper supporting member for engaging an upper end of the film spool. The upper supporting member is moved between its retracted position where it is retracted from the opening of the cartridge holder and its engaged position where it engages the film spool, its movement interconnecting with the movement of the cartridge holder between its cartridge accommodating and projecting positions.

21 Claims, 26 Drawing Sheets

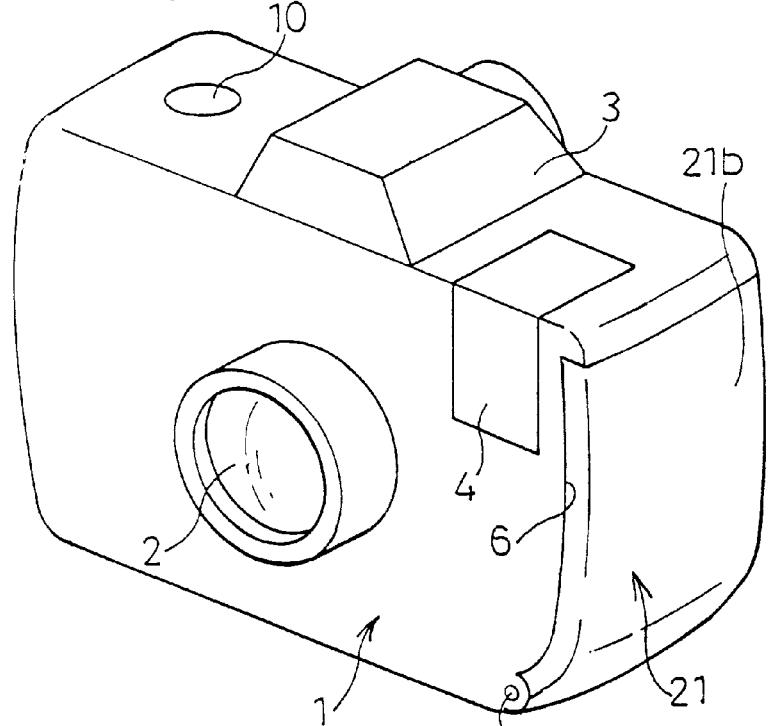
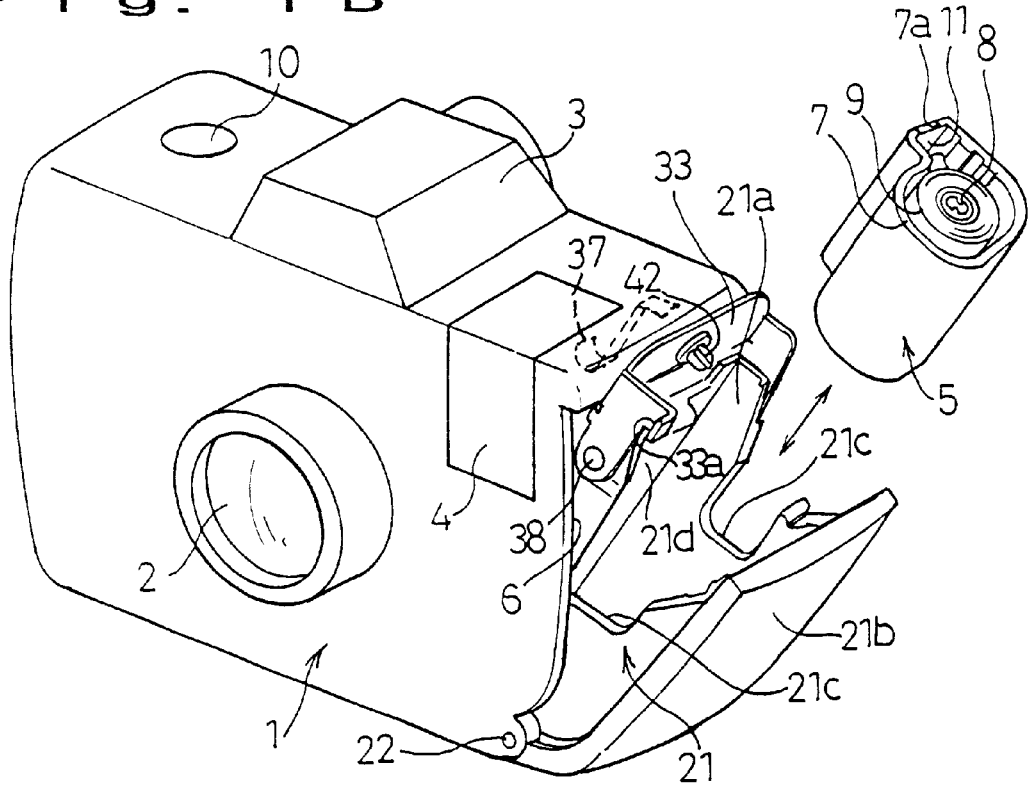

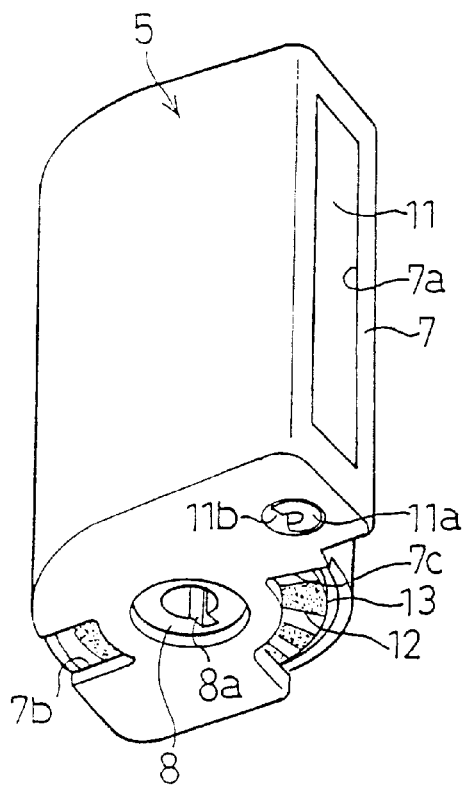
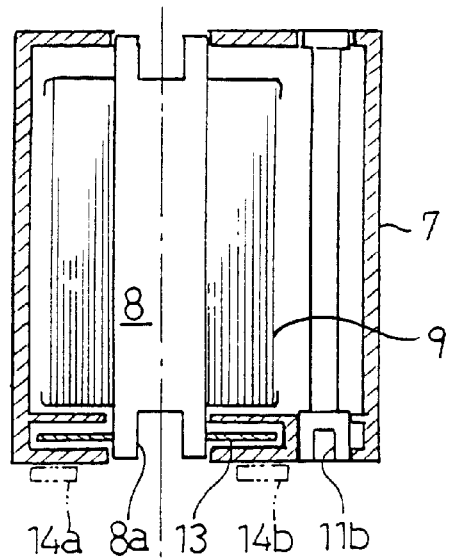
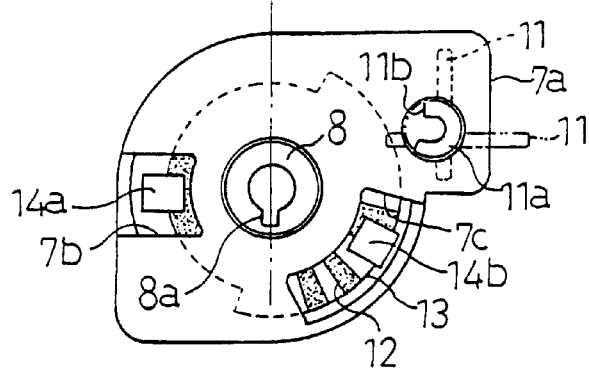

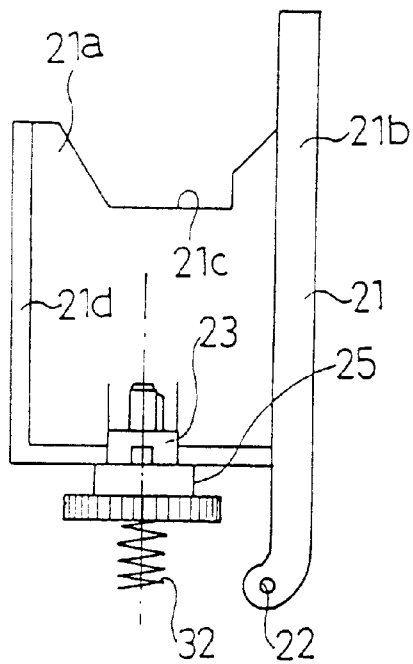
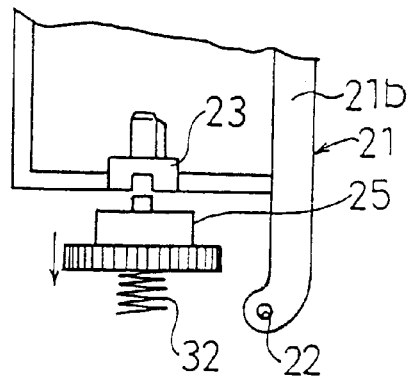
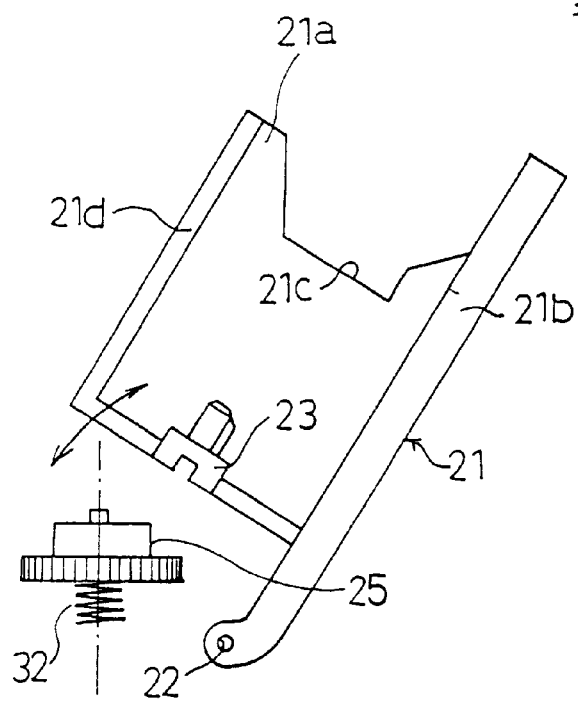

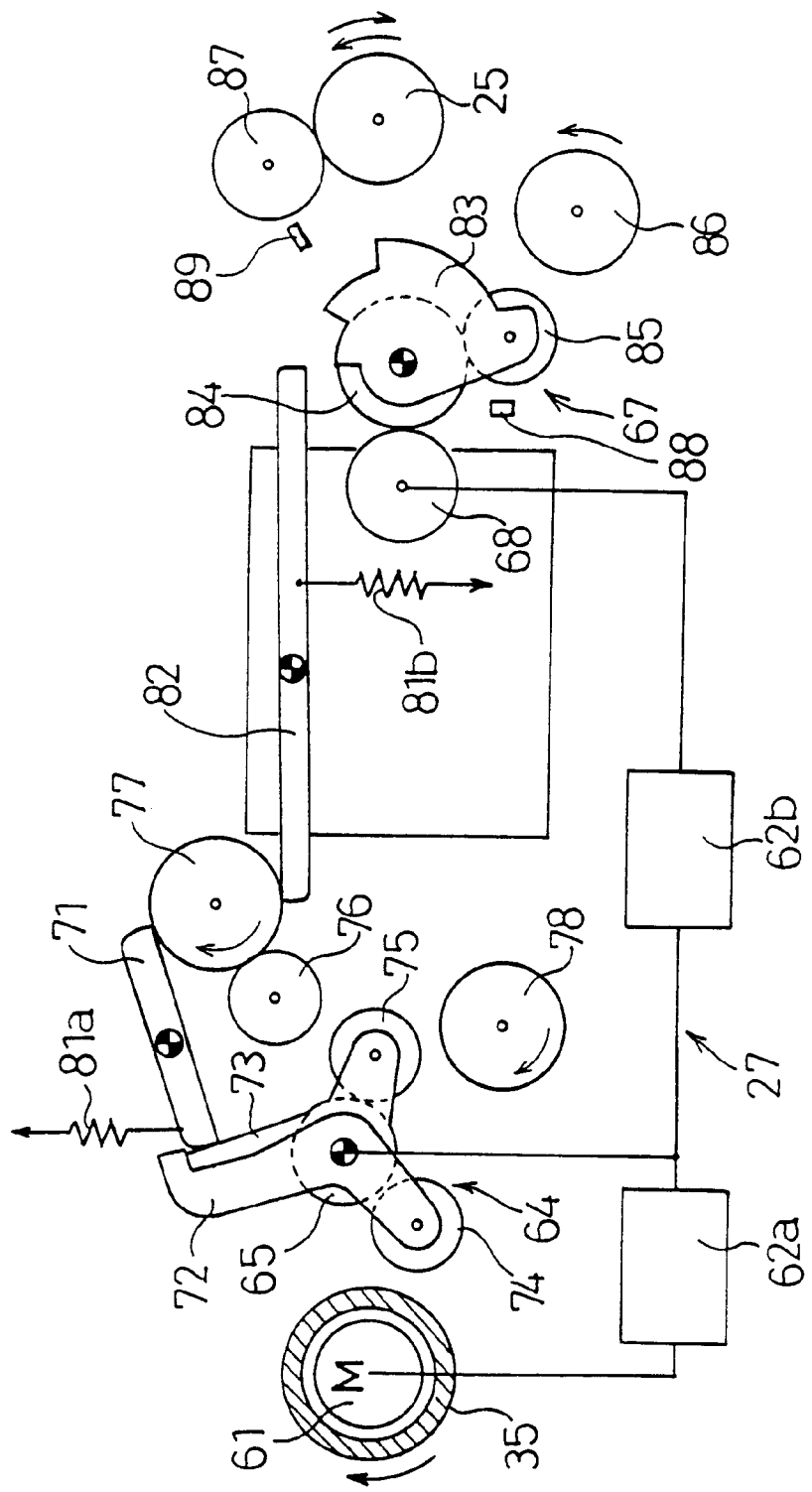

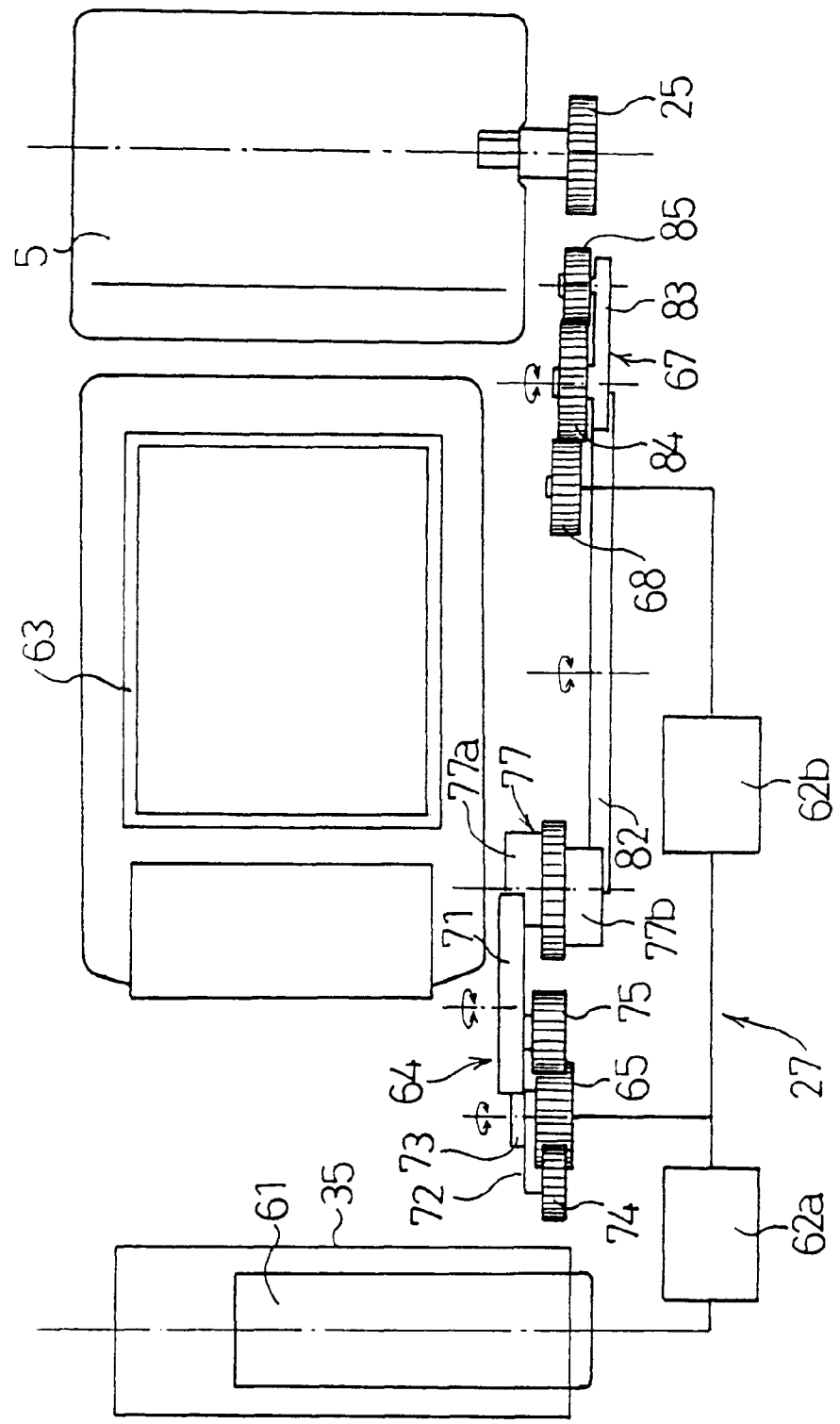

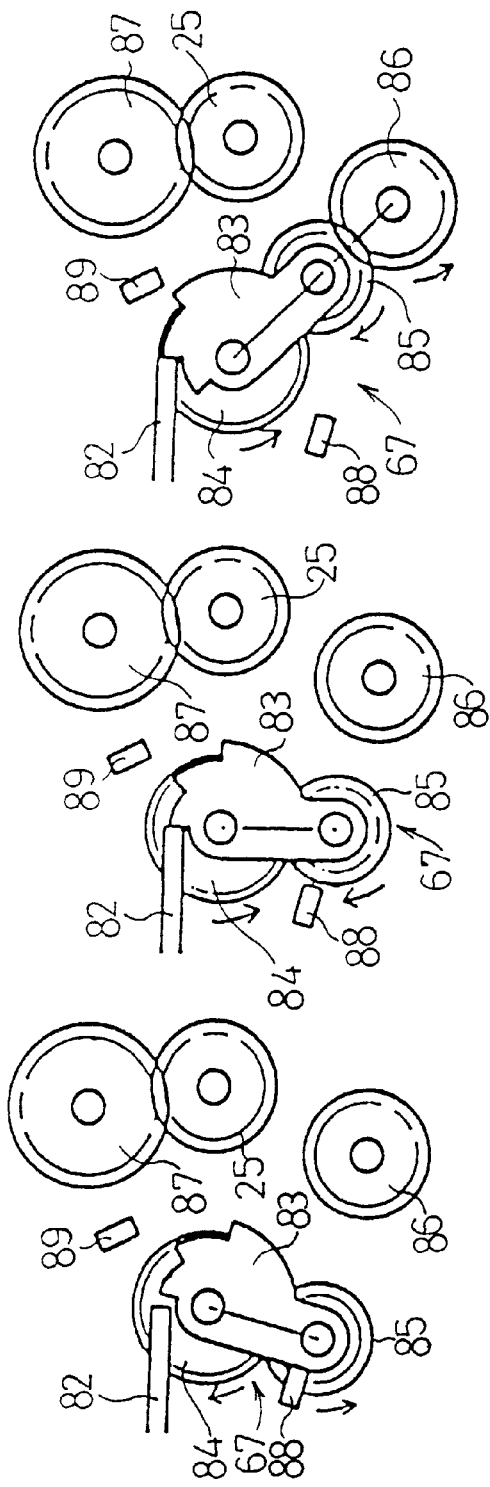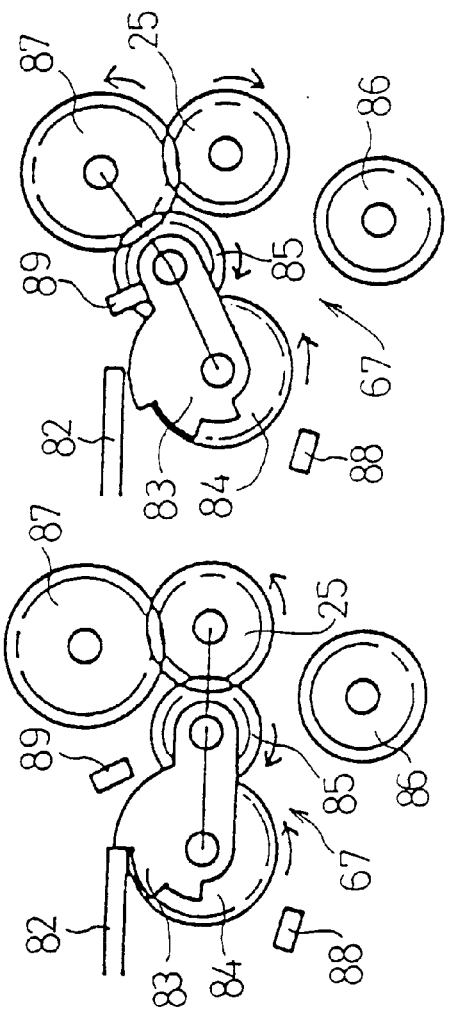
Fig. 14A  Fig. 14B  Fig. 14C
Fig. 14D  Fig. 14E

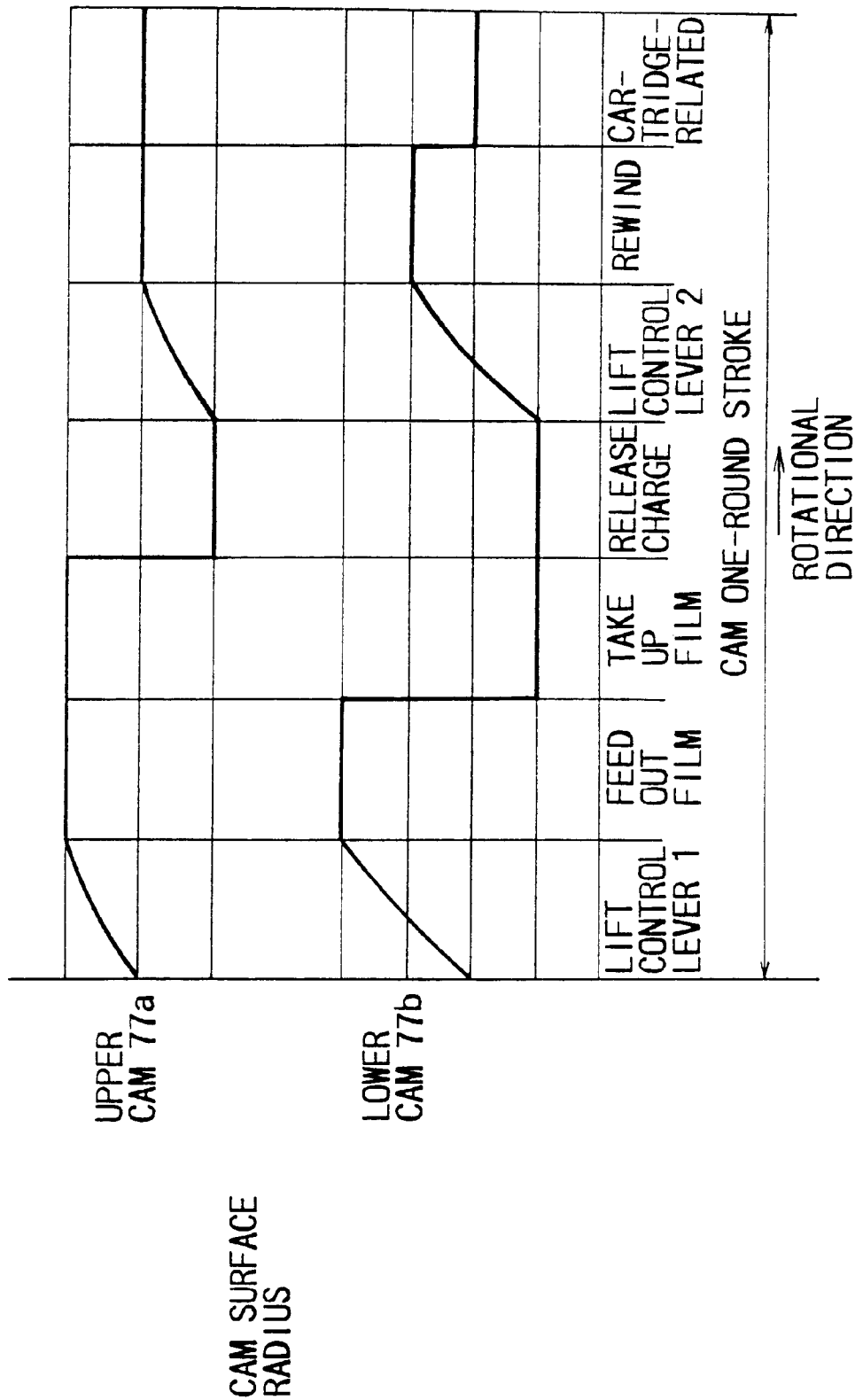

CAMERA

This application is a divisional of U.S. Ser. No. 08/790,618, filed Jan. 29, 1997, now U.S. Pat. No. 5,812,890.

BACKGROUND OF THE INVENTION

1. Technical Field of the Invention

The present invention relates to a camera which uses a film cartridge encasing a roll of filmstrip, and particularly to a camera having a cartridge holder for accommodating the film cartridge, which is movable between a first position projecting from the camera body for receiving the film cartridge and a second position in which the received film cartridge is accommodated in a predetermined position within the camera body.

2. Description of Related Art

Such cameras are suitable for a film cartridge used new type photographing system having a film ingress/egress slit for feeding out an encased filmstrip and a light-shielding door for opening and closing the slit. While the operation of loading the film cartridge is desired to be easy and quick, it is also desirable that the film cartridge is stably retained in an appropriate position so that the drive is assuringly transmitted to a film spool, but without inhibiting the smooth movement of the cartridge holder between its cartridge accommodating position and projecting position. It is also desired to keep the construction of the camera simple and compact, although the mechanisms for opening/closing the light-shielding door and for winding/rewinding the film generally require a large, complicated structure.

Japanese published unexamined patent application 4-80734 discloses a camera with a cartridge holder having an opening in the upper part for receiving a film cartridge inserted endwise along a shaft of a film roll. The cartridge holder has a fork at its bottom for engaging and driving the shaft of the film roll encased in the film cartridge. The standardized length of the engagement between the fork and the shaft is relatively long, but this does not obstruct the film cartridge loading operation, as the film cartridge is inserted into and removed from the cartridge holder through the opening in the same direction as that of said engagement. However, in order to facilitate the movement of the cartridge holder between its accommodating and projecting positions, the film cartridge is retained in the accommodated position by merely a spring pushing the film cartridge downward within the camera body. Since the shaft of the film roll is not fully supported, stable operation of the film cartridge cannot be ensured. Also, on the one hand the connection and disconnection between the fork member and a fork driving member can be easily accomplished concurrently with the linear movement of the cartridge holder, but on the other hand the cartridge holder needs a relatively large stroke because of its linear movement, causing a troublesome operation.

Japanese published unexamined patent application 4-80735 discloses a camera having a fork disposed within a camera body to reduce the moving volume of a cartridge holder. The fork is retracted from a position where it engages a film spool prior to movement of the cartridge holder between its accommodating and projecting positions, thereby enabling said movement of the cartridge holder. However, the space for retracting the fork needs to have the length more than the aforementioned standard engaging length, causing increase in the size of the camera and the complexity of the structure Japanese published unexamined patent application 2-114248 discloses a schematic driving system for driving several operations by a single motor. This configuration allows for a simple structure, since several sequential operations of driven members are all driven by the single motor alone. However, the photographing operations described in the above mentioned patent application include only feeding out a filmstrip to a winding spool and taking up the filmstrip by the winding spool, and many other necessary operations such as shutter release and opening/closing of the light-shielding door are not mentioned. Also, the driving force from the motor to each driven member is not individually transmitted. Various photographing operations are related to each other and driven at different speeds, and no mechanism has yet been proposed for satisfactory controlling all these operations by a single motor.

The driving system disclosed in the 2-114248 patent application employs a planetary mechanism. FIG. 31 shows a simplest configuration of such planetary mechanisms. A sun gear S has a coaxial planet carrier C, and a planet gear supported by the planet carrier C is meshed with the sun gear S. When the sun gear S is driven, a friction member provided either between the sun gear S and the planet carrier C or between the planet carrier C and the planet gear P acts on the planet carrier C to pivot with the rotation of the sun gear S, and the planet gear P supported by the planet carrier C revolves around the sun gear S. When the planet gear P comes to contact with any of driven gears D, D provided along the orbit of the planet gear P, the planet gear P engages the driven gear D at a predetermined position and disengages the same by moving away from the predetermined position. By stopping the planet carrier C by a stopper (not shown) when the planet gear P comes to engagement with the driven gear D, the rotation of the sun gear S is transmitted to the planet gear P which drives the driven gear D engaging with the planet gear P. Japanese published unexamined patent application 1-287648 discloses such a planetary mechanism.

However, the mechanism sometimes malfunctions in the following situation. When there are more than three driven gears D, D, one of the driven gears D, D must be placed in line with the sun gear S and the planet gear P as shown in FIG. 31A, in order that the planet gear P can optionally mesh with any of the driven gears D, D along its revolution. When the planet gear P and the driven gear D are coming into contact with each other as shown in FIG. 31B and 31C before they fall into line, one or two addenda of each wheel tend to easily catch each other, coming into a halt. Once the both gears become stationary, they are not able to further rotate in either direction, the addenda blocking each other, unless the sun gear S is rotated in the reverse direction. If the driving force is so strong that the gears S and D are not stopped by their addenda, supporting shafts or teeth of the gears might be damaged. Even when there are only two or fewer gears and no driven gears are placed in line with the gears and S P, as shown in FIG. 31A, the above described blocked condition cannot be fully prevented. Letter A depicts a line between the centers of the sun gear S and the planet gear P, and letter B depicts a line between the centers of the planet gear P and the driven gear D. The nearer the angle made by the lines A, B comes to 180 degree, the more easily the addenda of the gears catch each other.

BRIEF SUMMARY OF THE INVENTION

In view of the foregoing, it is a primary object of the present invention to provide a compact camera with a simple structure in which a cartridge holder can move between its accommodating and projecting positions, and a film cartridge can be readily inserted into or removed from the cartridge holder in its projecting position, while assuring accurate positioning of the film cartridge at the accommodated position and maintaining the stability in driving a film spool.

BRIEF DESCRIPTION OF THE DRAWINGS

FIGS. 1A and 1B are perspective views of a camera and a cartridge holder in a cartridge accommodating position where it is concealed within the camera body and in a cartridge receiving position where it is projecting from the camera body according to an embodiment of the present invention;

FIGS. 3A, 3B, 3C are perspective, sectional, and bottom plan views showing a film cartridge used in the camera of FIG. 1;

FIGS. 9A, 9B, 9C are sectional views showing each position of a fork gear and a status wherein the cartridge holder is moved;

FIG. 12 is a plan view of a driving system in a camera according to an embodiment of the present invention;

FIG. 13 is a front view of the driving system of FIG. 12;

FIGS. 14A, 14B, 14C, 14D, 14E are plan views of a selecting mechanism at a film rewind side in a driving system showing each operating status;

FIG. 15 is a graph showing changes in radius of a planet control cam in a driving system, and each operating status of a camera corresponding to each rotational position of the cam according to the present invention;

DETAILED DESCRIPTION OF THE INVENTION

Figures 2A, 2B:
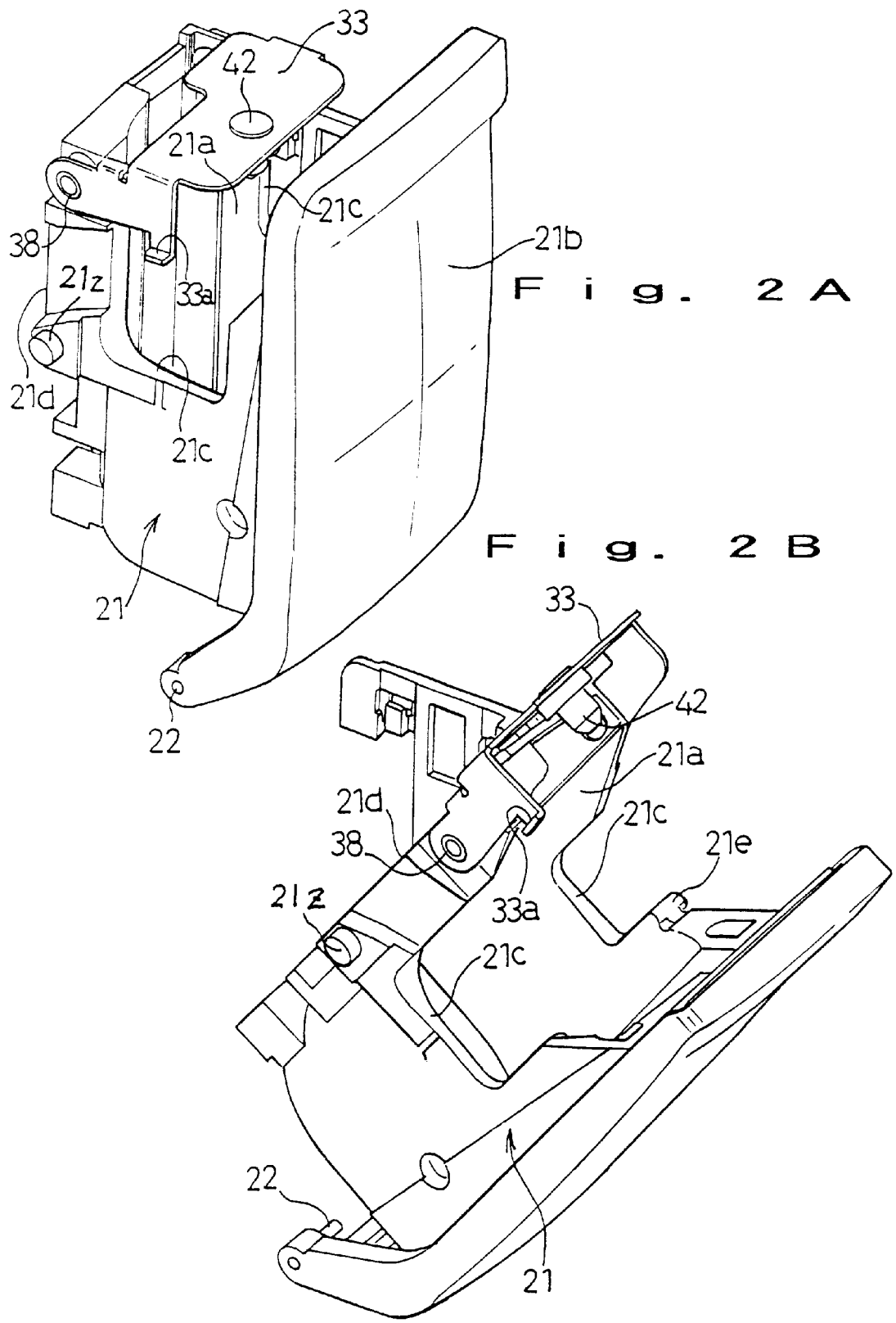
FIGS. 2A and 2B are perspective views of a cartridge holder of the camera shown in FIG. 1 in its cartridge accommodating position and projecting position.

Preferred embodiments of the present invention will be hereinafter described in conjunction with the accompanying drawings. Referring to FIGS. 1A and 1B, the camera described in this embodiment is a single-lens reflex camera and has a lens 2 and a retractable stroboscopic flash head 4 on the front face of the camera body 1. In the middle on the top surface is a view finder 3 using pentaprism, and to the right of it when seen from behind is a shutter release button 10. A cartridge chamber 6 for loading a film cartridge 5 is disposed at the opposite side of the camera body 1 with respect to shutter release button 10.

Figure 4A:
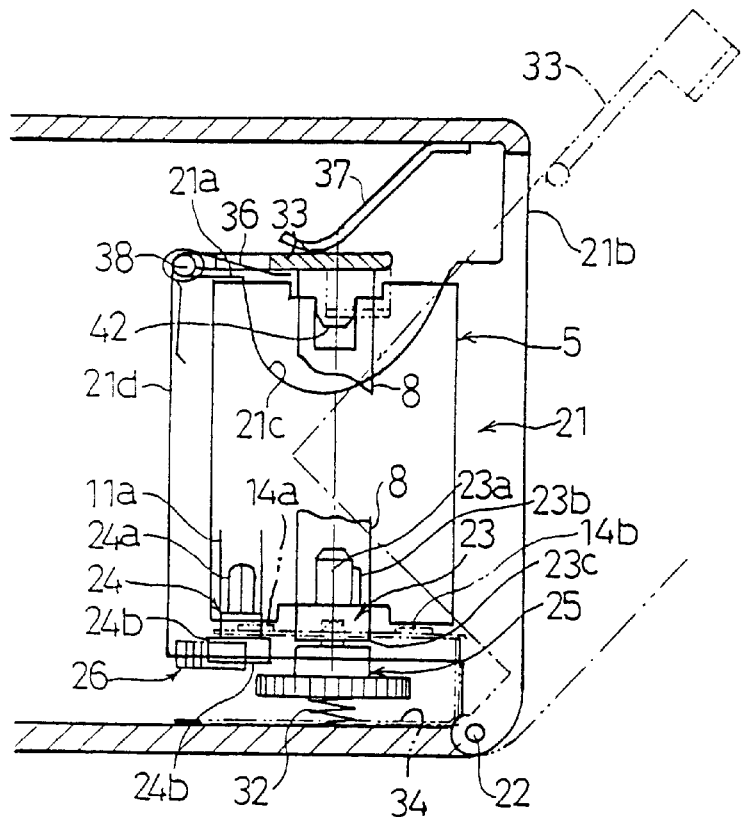
FIGS. 4A and 4B are sectional views showing an accommodated status of the cartridge holder of the camera shown in FIG. 1, and a driving force transmitting mechanism between a fork gear and a film spool.

Referring to FIGS. 1 and 3, the film cartridge 5 comprises a cartridge case 7 made of resin material and a film spool 8 generally passing through the center thereof and rotatably supported inside the cartridge case 7. An inner end of a film 9 is attached to the film spool 8, and the film 9 is wound into the cartridge case 7 through a film ingress/egress slit 7a by rotation of the film spool 8 in the film winding direction, or fed out from the slit 7a by reverse rotation the film spool 8 in the film unwinding direction. A light-shielding door 11 is provided along the film slit 7a, and pivotally supported by its shaft 11a for opening and closing the slit 7a. Open and closed status of the light-shielding door 11 is shown by a phantom line and a broken line, respectively, in FIG. 3C. The cartridge case 7 is of an irregular shape in its cross section with the film slit 7a projecting from the periphery of the cartridge case 7 in the tangential direction. The film spool 8 has an information disk 13 circumferentially provided with bar codes 12 or the like as shown in FIGS. 3A and 3C. The radial bar codes 12 provide data concerning film type, condition, and remainder. Read-out windows 7b, 7c are provided on the end surface of the cartridge case 7, disposed to face photo sensors 14a, 14b or the like provided in a cartridge holder 21 for reading out the data as shown in FIGS. 3B, 3C, and FIG. 4A Film exposure-status of the film 9 may be also indicated through an indicating portion on the other end face (not shown) of the cartridge case 7 showing whether the film 9 is unexposed, partly exposed, fully exposed, or processed, by stopping the film spool 8 at a predetermined position and utilizing the information disk 13. The photo sensors 14a, 14b in the cartridge holder 21 are connected to a control circuit (not shown) in the camera body 1 by a harness 34 disposed at the bottom part of the camera body 1 as shown in FIG. 4A via a pair of pins 22, 22 pivotally supporting the cartridge holder 21. Such a simple wire structure allows signals to be transmitted and received without being influenced by transverse movement of the cartridge holder 21 between the open and closed positions.

FIGS. 2A and 4A show the cartridge holder 21 housed in the cartridge chamber 6. The cartridge holder 21 comprises a concave having a cross section commensurate in shape with the cartridge case 7. The film cartridge 5 is inserted through an opening 21a which opens upward along the direction of axis of the film spool 8, and is always received in a certain direction. The cartridge holder 21 has a cover 21b hinged by the pair of pins 22, 22 provided at both sides in the bottom edge of the cartridge chamber 6 for opening and closing the cartridge chamber 6. Cutouts 21c are formed at upper end of both side walls of the cartridge holder 21 for conveniently grabbing the film cartridge 5 by fingers. At the bottom of the cartridge holder 21, a fork 23 and a door driving member 24 are provided as intermediate drive transmission members for driving the film spool 8 and the light-shielding door 11, respectively, the fork 23 coupling with a lower end of the film spool 8 and the door driving member 24 coupling with a lower end of the shaft 11a of the light-shielding door 11 as shown in FIG. 4A. The fork 23 and the door driving member 24 may be omitted, in which case the film spool 8 and the shaft 11a of the light-shielding door 11 are directly coupled to driving members in the camera body 1 and driven thereby.

As shown in FIG. 1A, when the cartridge chamber 6 is closed, the cover 21b serving as a surface portion of the camera body 1 conceals the cartridge holder 21 in a cartridge accommodating position within the camera body 1. When the cartridge chamber 6 is opened as shown in FIGS. 1B and 2B, the cartridge holder 21 locates at a projecting position outside the camera body 1, exposing the opening 21a. The film cartridge 5 is inserted to or removed from the cartridge holder 21 at this projecting position. A stopper 21z integrally formed on the cartridge holder 21 and a latch member (not shown) provided in the camera body 1 restrict the maximum projecting amount of the cartridge holder 21, thereby preventing possible damages to the harness 34 or other members caused by the cartridge holder 21 rotating too much around the pins 22, 22. The cartridge holder 21, after receiving the film cartridge 5 in a predetermined direction at the projecting position shown in FIGS. 1B and 2B and being moved to the cartridge accommodating position shown in FIGS. 1A and 2A accommodates and postures the film cartridge 5 at a predetermined loading position in the camera body 1.

Referring to FIG. 4A, a fork gear 25 and a door driving gear 26 as driving members are provided within the camera body at a position corresponding to the loading position of the film cartridge 5, the fork gear 25 coupling with the fork 23 for driving the film spool 8 and the door driving gear 26 coupling with the door driving member 24 for opening and closing the light-shielding door 11 when the cartridge holder 21 is in the accommodating position. As mentioned above, various other structures can be employed instead of providing the above described intermediate drive transmission members and driving members, depending on types of drive transmission for the film spool 8 and the door shaft 11a or for a driving system 27 provided in the camera body 1 as shown in FIG. 12 and FIG. 13.

In this embodiment, the fork 23 and the door driving member 24 are rotatably supported by a bottom wall of the cartridge holder 21, and fitted therein in such a way that they extend from outside the bottom wall to the interior of the cartridge holder 21. The fork 23 has a driving shaft 23a which extends upward into the cartridge holder 21 for coupling with the lower end of the film spool 8 in the axial direction. A key 23b is provided for fastening the driving shaft 23a the film spool 8 for transmitting rotation by fitting into a key aperture 8a at the lower end of the film spool 8. The key 23b can advance and retreat in the axial direction with respect to the driving shaft 23a, and is retained in a coupled position fitting in the key aperture 8a by the force of a spring 28. The key 23b may be constructed to advance and retreat in the radial direction with respect to the fork 23. When the key 23b is not fitting in the key aperture 8a as film cartridge 5 is inserted into the cartridge holder 21, the fork 23 is driven to rotate until the key 23b matches the key aperture 8a while the key 23b is retreated against the force of the spring 28. Accordingly, the key 23b and the key aperture 8a do not interfere with each other when they are not coupled. When the key 23b comes to face the key aperture 8a, the key 23b urged by the spring 28 advances to fit in the key aperture 8a, whereby transmitting the rotation of the fork 23 to the film spool 8. A bifurcating forked portion 23c is provided to the fork 23 beneath the outer bottom wall of the cartridge holder 21 for coupling with a mating forked portion 25a provided to the upper surface of the fork gear 25 in the axial direction to transmit the rotation of the fork gear 25 to the film spool 8 through the fork 23.

Figure 7A:
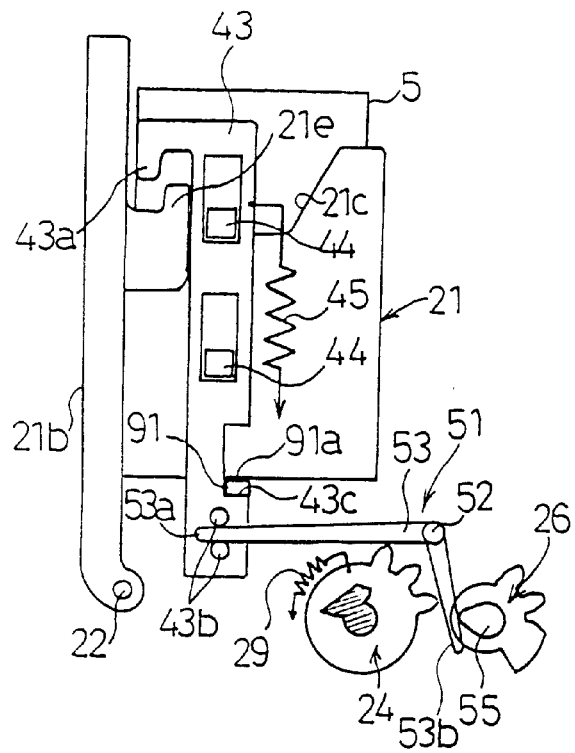
FIGS. 7A and 7B are side and front views of a cartridge holder showing a status in which the cartridge holder is unlocked and a status in which a fork gear is retracted.
Figure 8A:
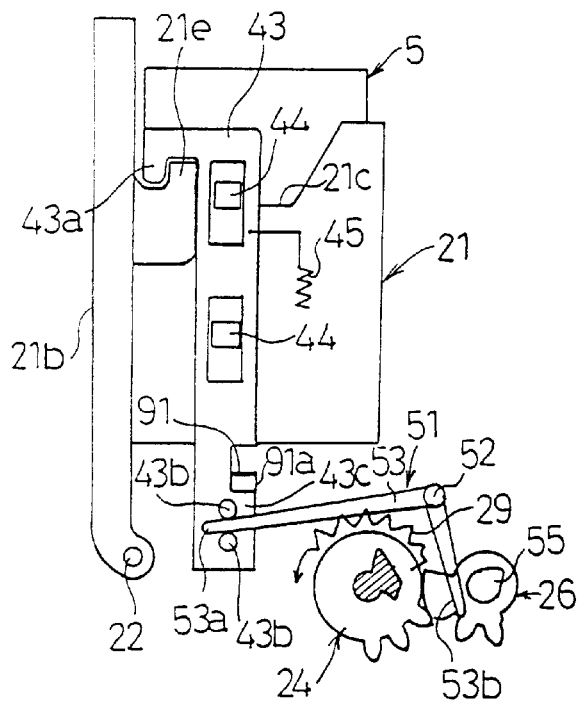
FIGS. 8A and 8B are side and front views of a cartridge holder showing a status in which the cartridge holder is locked and a status in which a fork gear is engaged.

The door driving member 24 has a key 24a within the cartridge holder 21 for fitting into a key hole 11b provided at the lower end of the shaft 11a of the light-shielding door 11. Beneath the outer bottom wall of the cartridge holder 21 is a driven gear 24b for mating with the door driving gear 26. The film cartridge 5 is inserted into the cartridge holder 21 always in a certain direction and the light-shielding door 11 is closed whenever the film cartridge 5 is received by the cartridge holder 21, whereby the position and the rotational direction of the light-shielding door shaft 11a is determined. A spring 29 is applied between the door driving member 24 and the cartridge holder 21 as shown in FIGS. 6, 7A, and 8A to urge the door driving member 24 to be always kept at an initial rotational position shown in FIGS. 6A, 6E, and 7A so that the key 24a always waits facing to a certain direction where it directly fits in the key hole 11b of the shaft 11a in the axial direction when the film cartridge 5 is inserted into the cartridge holder 21. This enables the shaft 11a and the key 24a to always couple with each other in the axial direction when the film cartridge 5 is inserted into the cartridge holder 21. Moreover, the key 24a and the driven gear 24b are provided as separate members divided into upper and lower parts, transmitting the rotation of the drive gear 24b to the key 24a with a spring or the like applied therebetween (not shown) in order to prevent any damages when overburdened.

Figure 4B:
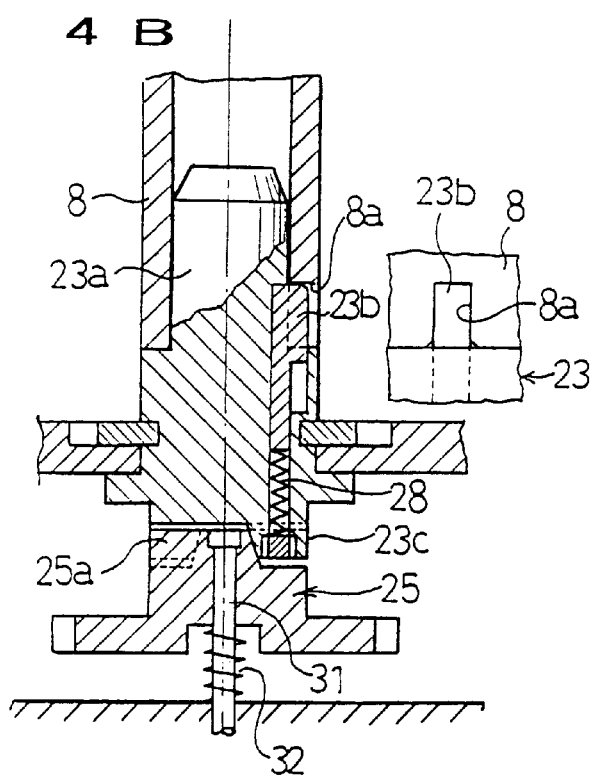

The cartridge holder 21 is moved between open and close positions by a simple single-axis rotation around the pair of pins 22, 22 in the direction crossing an axis of the film spool 8 of the film cartridge 5 received by the cartridge holder 21. If the cartridge holder 21 is moved between the two positions with the forked portions 23c, 25a coupled with each other, they might be damaged by interfering with each other, as the fork 23 at the cartridge holder 21 side and the fork gear 25 at the camera body 1 side are interlocked with each other in the axial direction. To prevent such interference, the fork gear 25 is constructed to be retractable downward from the coupled position shown in FIG. 4. The fork gear 25 is supported by a shaft 31 fixed in the bottom wall of the camera body 1 in such a way that the fork gear 25 can rotate and move vertically. The fork gear 25 is retained in the position where it couples with the film spool 8 by the force of a spring 32 applied between the fork gear and the bottom wall of the camera body 1, and is retracted downward when the cartridge holder 21 is moved. The above-mentioned configuration may be employed in any structure in which the film cartridge 5 is moved in the direction crossing its axis. For example, the pins 22, 22 pivotally supporting the cartridge holder 21 may be vertically provided.

Figure 5A:
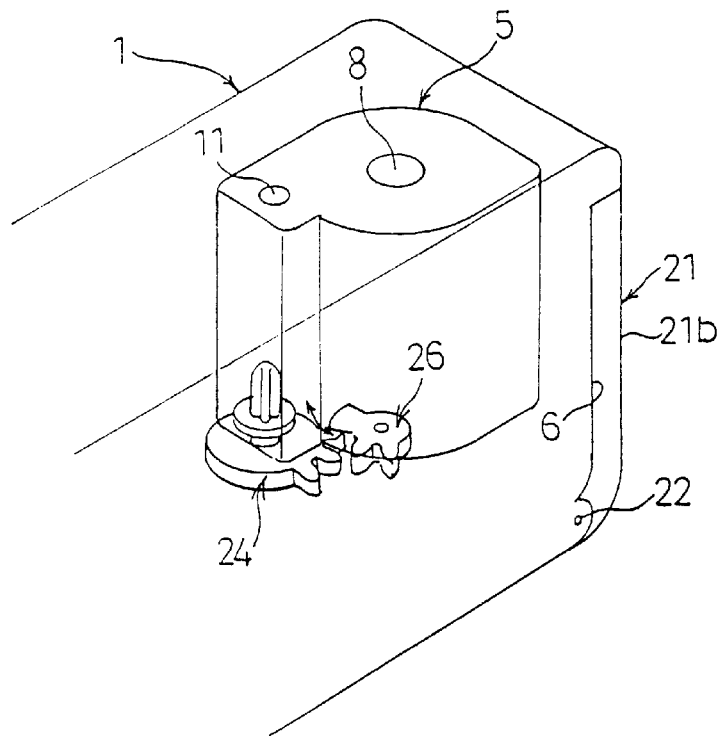
FIGS. 5A and 5B are schematic perspective views of a cartridge holder in its accommodating and projecting position showing a status wherein a driving force is transmitted to open and close a light-shielding door of the film cartridge and a status in which the transmission is disconnected.
Figure 5B:
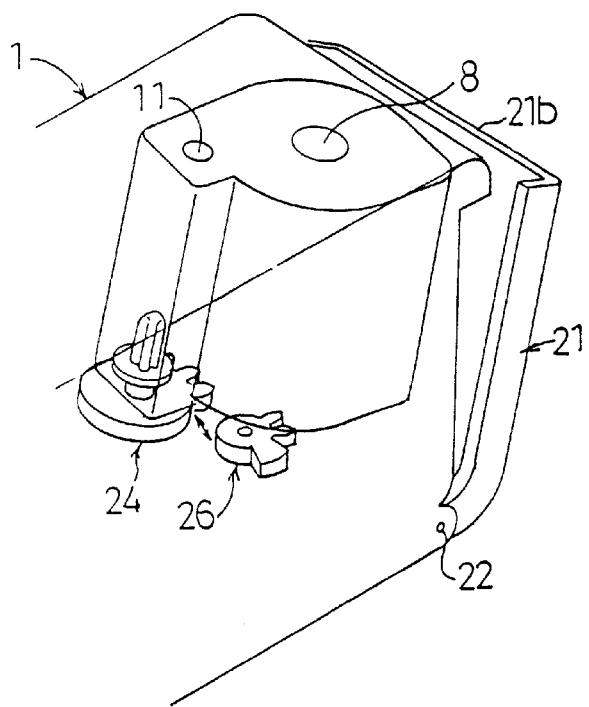

The driven gear 24b of the door driving member 24 is also moved in the direction crossing the axis of the film cartridge 5, accompanying the horizontal movement of the cartridge holder 21. The driven gear 24b and the door driving gear 26 in the camera body 1 are located to have different distances from the pins 22, 22. Also, the driven gear 24b and the door driving gear 26 mesh with each other at different hights with respect to the pins 22, 22. By utilizing at least one of these differences in distance and height between the gears 24b and 26, the two gears can smoothly engage and disengage each other, the driven gear 24b being released from the door driving gear 26 by a radial movement as shown in FIG. 5. As can be seen in FIGS. 5–8, both the driven gear 24b and the door driving gear 26 are intermittent gears. The driven gear 24b and the door driving gear 26 are controlled to face each other at their gaps where there are no teeth as shown in FIG. 6E when the cartridge holder 21 is moved, so that the gears 24b and 26 do not interfere with each other.

Figure 6A:
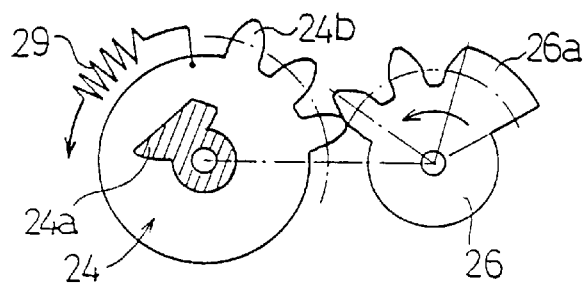
FIGS. 6A, 6B, 6C, 6D, 6E are top plan views of a door driving gear and a driven gear showing each status in driving operations of opening and closing a light-shielding door of a film cartridge.
Figure 6B:
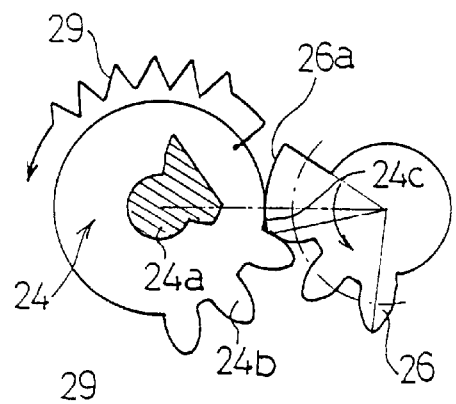
Figure 6C:
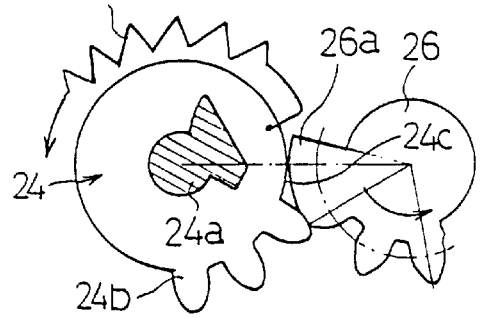
Figure 6D:
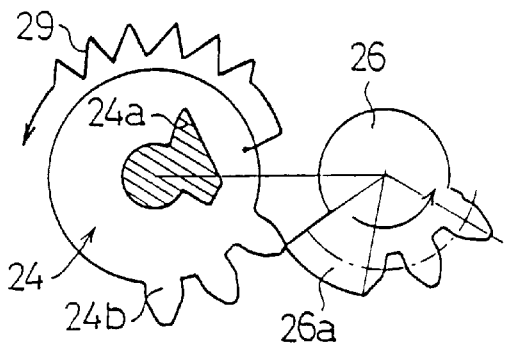
Figure 6E:
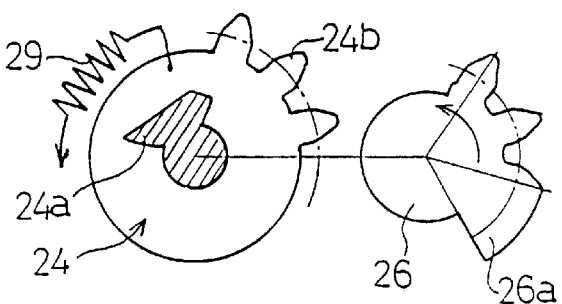

When the cartridge holder 21 is detected to be in the accommodating position by a sensor such as a microswitch (not shown) provided in the camera body 1, the driving system 27 shown in FIGS. 12 and 13 operates the door driving gear 26 to rotate from the position shown in FIG. 6A to the position shown in FIG. 6C. The door driving gear 26 may be stopped at any positions shown in from FIGS. 6C to 6D. By this rotation the light-shielding door 11 is opened, and kept in the opened status by a cam 26a of the door driving gear 26 being caught at the boundary 24c between the teeth and the gap of the driven gear 24. The film spool 8 is then driven to rotate, feeding out the film 9 from the film cartridge 5 to a take-up spool 35 as shown in FIG. 12 and FIG. 13. After that, the film 9 is wound by the driven take-up spool 35 each time the shutter is released by operation of the release button 10, whereby pictures are taken consecutively. When the film cartridge 5 is desired to be taken out by completion of exposing all the film 9 or stoppage of photographing, the film 9 is rewound under the state shown in FIG. 6C and then the door driving gear 26 is further rotated to release the engagement with the driven gear 24, so that the driven gear 24 is returned to its initial rotational position shown in FIG. 6E by the force of the spring 29, whereby shutting the light-shielding door 11.

The cartridge holder 21 has a lid plate 33 covering the upward concave of the cartridge holder 21 from above. The lid plate 33 is pivotally supported by a pair of pins 38, 38 substantially parallel to the pins 22, 22 and provided at the upper edge of the inner wall 21d of the cartridge holder 21 opposite to the cover 21b. The lid plate 33 is urged by a spring 36 in a direction toward the open status and is interlocked with parts of the camera body 1. More particularly, the lid plate 33 is opened interconnecting with the movement of the cartridge holder 21 from the accommodating position to the projecting position, and is closed interconnecting with the movement of the cartridge holder 21 from the projecting position to the accommodating position. On the upper inner wall of the camera body 1 is a spring 37 made of a plate spring or the like as shown in FIGS. 1B and 4A pushing the lid plate 33 downward. The spring 37 exerts stronger force than the spring 36, and thus the composition of both forces acts downward, supporting the cartridge holder 21 with the spring 32 therebetween when the cartridge holder 21 is in the projecting position. During the movement of the cartridge holder 21 toward the projecting position, the spring 37 keeps pushing the lid plate 33 downward, preventing the lid plate 33 from sticking against the upper inner wall of the camera body 1. When the cartridge holder 21 is completely opened, the lid plate 33 is freed from the spring 37 and retracts upward by the force of the spring 36. The lid plate 33 has a supporting shaft 42 for coupling with the upper end of the film spool 8 in the film cartridge 5 received in the cartridge holder 21. The supporting shaft 42, together with the fork 23 and the door driving member 24, retains the film cartridge 5 assuringly at one position in the cartridge holder 21, supporting the film cartridge 5 both from upper and lower ends in order to ensure the driven rotation by the fork gear 25. The supporting shaft 42 is constructed relatively short so that it can smoothly engage and disengage the upper end of the film spool 8 with the movement of the lid plate 33 pivoting around the pins 38, 38. On the contrary, the driving shaft 23a and the key 24a have larger coupling lengths with the film spool 8 and the key hole 11b so as to ensure accurate and stable positioning of the film cartridge 5. The fork 23 and the door driving member 24 are thus deeply interlocked with their mating members without obstructing any movement of the cartridge holder 21, since the coupling direction is the same as that of insertion/removal of the film cartridge 5.

A lock member 43 is provided inside the camera body 1 as shown in FIGS. 7, 8, 10, and 11, to secure the cartridge holder 21 brought to the accommodating position. The lock member 43 is supported by a guide 44 which allows for vertical movement of the lock member 43 and has a hook portion 43a with an angled edge. The lock member 43 is retained at its locked position being pulled by a spring 45 downward. When the cartridge holder 21 is moved to the accommodating position, the hook portion 43a is temporarily pushed up against the force of the spring 45 by being pressed against a catch 21e integrally formed on the cartridge holder 21. Then, the hook portion 43a returns to its locked position by the force of the spring 45 when the cartridge holder 21 completes its movement to the accommodating position, the hook portion 43a received by the catch 21e, thereby locking the cartridge holder 21 at its accommodating position and preventing the cartridge holder 21 from being accidentally opened.

If the cartridge holder 21 can be unlocked and opened anytime, there still remains the possibility that the cartridge holder 21 is undesirably opened while the light-shielding door 11 of the film cartridge 5 is opened, letting ambient light enter into the film cartridge 5. To prevent such accidental opening of the cartridge holder 21, a linking mechanism 51 is provided in the driving system 27 in the camera body 1 which makes the lock member 43 move interconnected with the movement of the fork gear 25. The lock member 43 is thus moved to its unlocked position only after the fork gear 25 for driving the film spool 8 moves to its retracted position, and the fork gear 25 interlocks with the film spool 8 only after the cartridge holder 21 is locked by the lock member 43.

Figure 11:
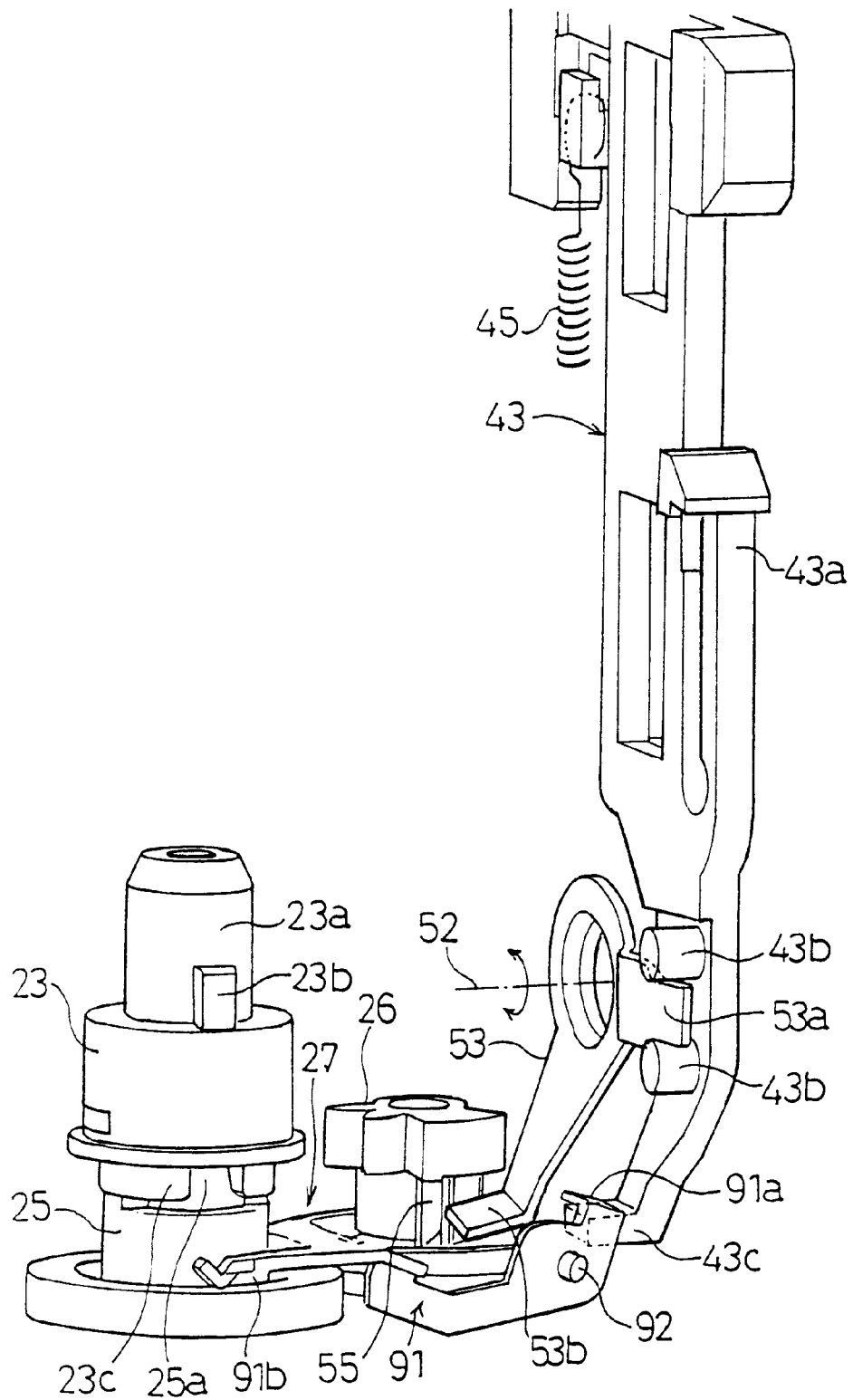
FIG. 11 is a perspective view depicted with the cartridge holder of FIG. 10 cut away and seen from a different angle.

Descriptions of the linking mechanism 51 will be made referring to FIGS. 7, 8, 10, and 11. The linking mechanism 51 comprises a linking drive lever 53 which connects rotation of the door driving gear 26 to vertical movements of the lock member 43, and a linking lever 91 which connects vertical movements of the lock member 43 to those of the fork gear 25. Referring to FIG. 11, the linking drive lever 53 is pivotal supported at its center by a rod 52, and one end 53a of the linking drive lever 53 is nipped between a pair of pins 43b provided on the lock member 43 to rotate in accordance with vertical movements of the lock member 43. The other end 53b of the linking drive lever 53 is opposing to a cam 55 provided to the door driving gear 26 to rotate therewith, and the end 53b is driven by rotation of the door driving gear 26 opening and closing the light-shielding door 11 through the cam 55. The linking lever 91 is pivotally supported at its center by a rod 92. One end 91a of the linking lever 91 sits on a right angled catch 43c at the lower end of the lock member 43, and the other end 91b of the linking lever 91 rests on the upper surface of the fork gear 25. By the linking mechanism 51 as described above and operation control by the driving system 27, the movement of the lock member 43 is connected to that of the fork gear 25 through the door driving gear 26, the cam 55, and the linking drive lever 53. Upward movement of the cartridge holder 21 against the spring 45 is controlled to link with open/close operations of the light-shielding door 11 of the film cartridge 5.

Figure 7B:
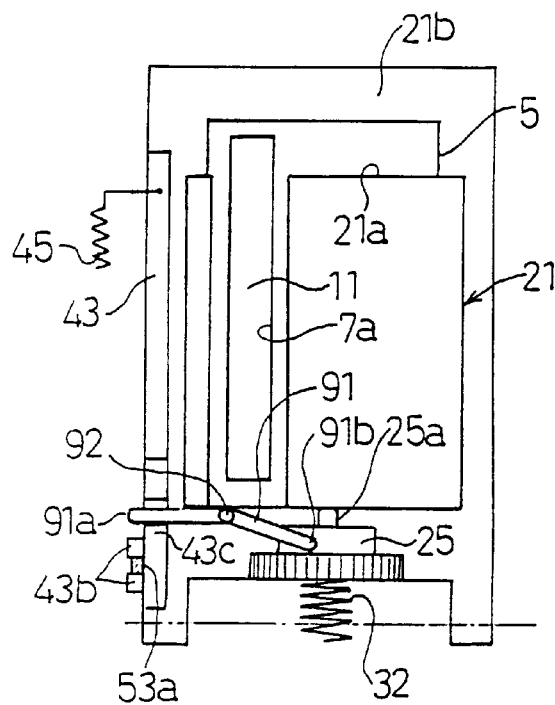
Figure 8B:
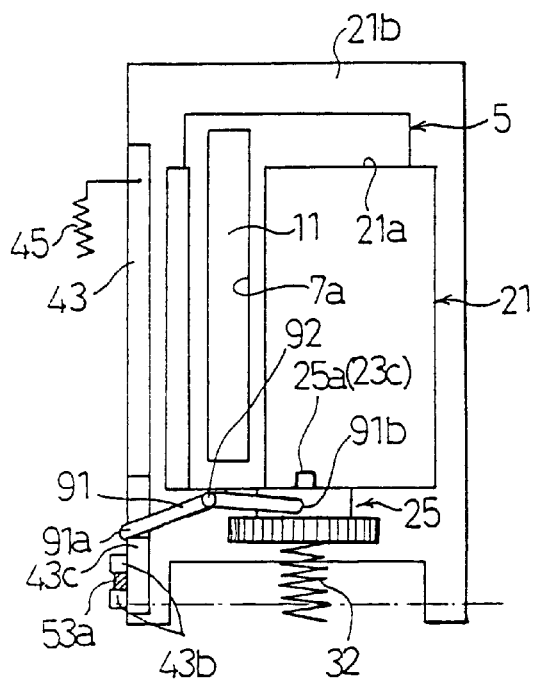
Figure 10:
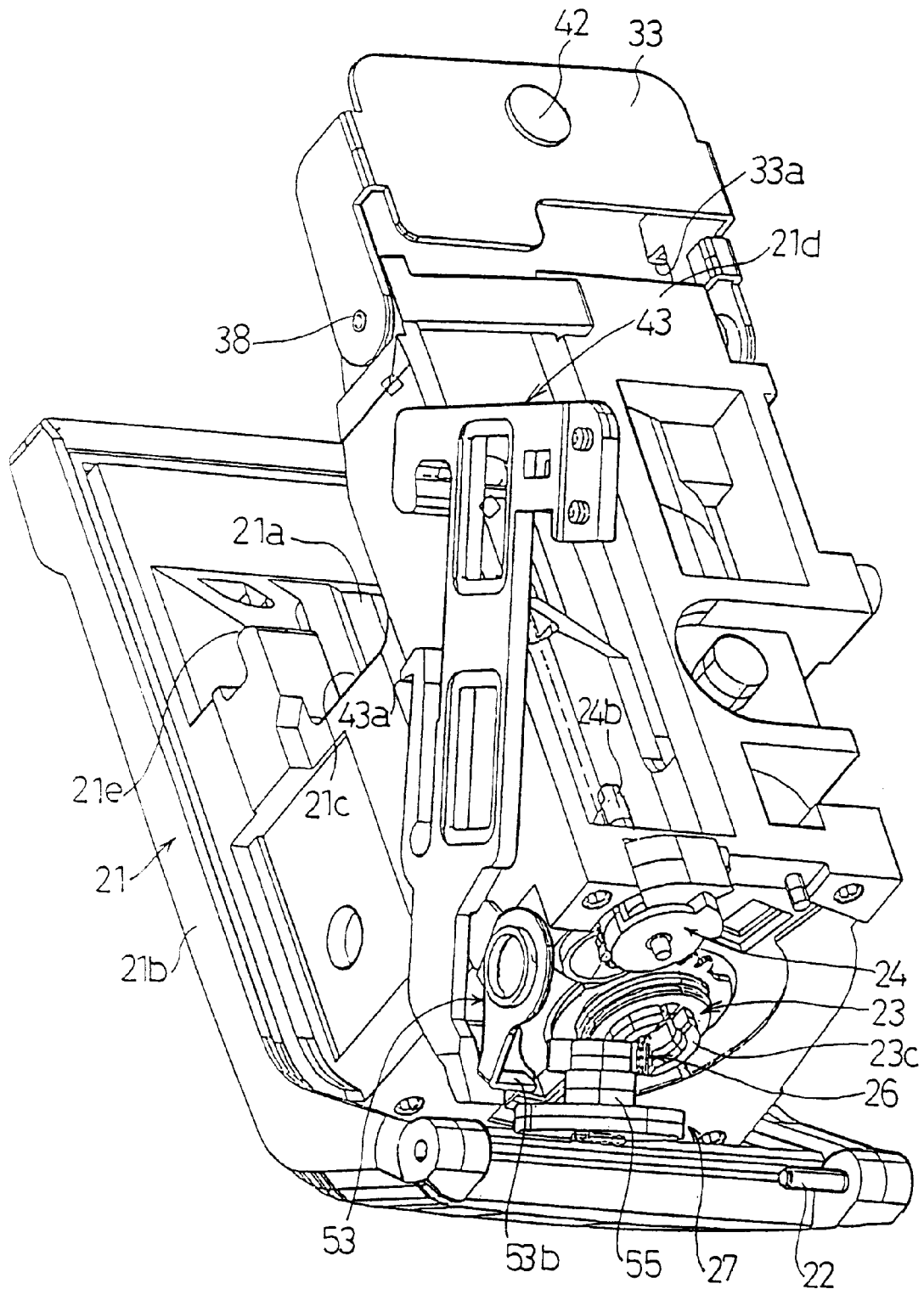
FIG. 10 is a perspective view of a cartridge holder in its projecting position showing how the cartridge holder and a lock member are related.

Accordingly, the cartridge holder 21 is unlocked only when the light-shielding door 11 is closed as shown in FIG. 7, preventing an undesirable opening of the cartridge holder 21 which causes the film 9 to be exposed by ambient light. When the cartridge holder 21 is closed, the driving system 27 shuts the light-shielding door 11 and the lock member 43 locks the cartridge holder 21, interconnecting with the closing operation of the light-shielding door 11 by means of the door driving gear 26, the cam 55, and the linking drive lever 53 as shown in FIG. 8. The linking lever 91 being interlocked with lock member 43 lets the fork gear 25 rise by the force of the spring 32 to engage the fork 23 as shown in FIG. 8 and 9A, after the light-shielding door 11 is closed and the cartridge holder 21 is locked by the lock member 43. When the film 9 is desired to be taken out after finishing photographing, the cartridge holder 21 is unlocked by control of the driving system 27 as shown in FIGS. 7 and 9B. The linking lever 91 being interlocked with the lock member 43 pushes down the fork gear 25 against the spring 32 to the retracted position, thereby releasing engagement with the fork 23 before the cartridge holder 21 is unlocked. Accordingly, the cartridge holder 21 after being unlocked can freely move around the pins 22, 22 as shown by an arrow in FIG. 9C, as the engagement between the fork 23 and the fork gear 25 is timely released.

As described above, the linking mechanism 51 comprising the door driving gear 26, the cam 55, the linking drive lever 53, and the linking lever 91 connects the movements between the lock member 43 and the fork gear 25 which drives the film spool 8 of the film cartridge 5 in the cartridge holder 21. The lock member 43 moves to its released position only after the fork gear 25 retracts, and the fork gear 25 interlocks with the fork 23 only after the completion of locking the cartridge holder 21. The fork gear 25 is moved between its retracted position and interlocked position at a right timing in connection with locking and unlocking operations of the cartridge holder 21 by such a simple mechanism using a single driving mechanism. Concrete configuration of the linking mechanism 51 which comprises the door driving gear 26, the cam 55, the linking drive lever 53, and the linking lever 91 is not limited to the one described in this embodiment, and may be variously constructed, as long as it accomplishes the safety interlock function to prevent the cartridge holder 21 from being accidentally opened.

In this embodiment, all operations are driven by one motor 61 shown in FIGS. 12 and 13. The motor 61 is disposed coaxially within the take-up spool 35, situating at the opposite side of the camera with respect to the side where the film cartridge 5 is loaded, a mechanism for exposing the film such as a mirror box 63 locating therebetween. As the motor 61 is coaxially housed in the take-up spool 35, it requires no extra space. Rotation of the motor 61 is transmitted to a sun gear 65 in a selecting mechanism 64 at the film take-up side with respect to the mirror box 63 through a reduction system 62a, as well as to an idler gear 68 in a selecting mechanism 67 at the film cartridge loading side through the reduction systems 62a and 62b. As described above, the motor 61 and the cartridge holder 21 are located at opposite sides with the mirror box 63 therebetween, and the selecting mechanism 67 is disposed at the cartridge holder side for switching driving force transmission corresponding to the needs such as for winding the film 9, rewinding the film 9, or opening/closing the light-shielding door 11. Since the selecting mechanism 67 is located at the cartridge holder side, it is unnecessary to provide several driving force transmitting paths traversing the mirror box 63 from the motor 61. The drive force outputs from the motor 61 are transmitted to the cartridge holder side via the two reduction systems 62a and 62b. The operation speed would thus be reduced if the selecting operation of the selecting mechanism 67 was carried out via said both reduction systems. To speed up the selecting operation at the cartridge holder side, the selecting mechanism 67 is controlled by a rewind control lever 82, which is operated by the selecting mechanism 64 at the film take-up side. Since the selecting mechanism 64 is disposed in the vicinity of the motor 61 and driven via only one reduction system 62a, the selecting operation of the selecting mechanism 67 is performed at a higher speed by way of the rewind control lever 82. The selecting mechanism 64 operates according to needs by rotation of the motor 61 in the normal direction and thereby selects a driven system to which the driving force of the motor 61 is transmitted. The motor 61 is switched in a way described later to rotate in the reverse direction in order to transmit the driving force of the motor 61 to the selected driven system. When the motor 61 rotates in the normal direction, the take-up sun gear 65 rotates counterclockwise, and when the motor 61 rotates reversely, the take-up sun gear 65 rotates clockwise and a rewind sun gear 84 is rotated counterclockwise.

The selecting mechanism 64 at the film take-up side comprises the sun gear 65, a take-up planet carrier 72, and a release charge planet carrier 73, and the both carriers 72, 73 are supported by the sun gear 65 and rotated therewith. A take-up control lever 71 selectably stops the rotation of the carriers 72, 73 by changing its position. The take-up planet carrier 72 brings a take-up planet gear 74 to engage or disengage the take-up spool 35 by rotating clockwise with the take-up sun gear 65, whereby switching from a status wherein the rotation of the motor 61 is transmitted to the take-up spool 35 to another status wherein the motor 61 and the take-up spool 35 are disconnected. The release charge planet carrier 73 brings a release charge planet gear 75 to engage and disengage an idler gear 76 which transmits the driving force of the motor 61 to a planet control cam 77. The plane control cam 77 changes the positions of the take-up control lever 71 and the rewind control lever 82. The planet control cam 77 thus functions to select a driven system in both selecting mechanisms 64, 67 and to keep the selected condition. Each control lever 71 and 82 is provided with springs 81a, 81b to be driven by an upper cam 77a and a lower cam 77b of the planet control cam 77. The release charge planet carrier 73 also brings the release charge planet gear 75 to engage and disengage a release charge cam 78 to transmit the driving force of the motor 61, enabling and disabling shutter release, shutter charge, or vertical movements of the mirror box 65.

In the selecting mechanism 67 at the film rewind side, i.e., the cartridge holder side, a rewind planet carrier 83 is rotated with the sun gear 84 engaged with the idler gear 68, when the rotation of the motor 61 is transmitted to the idler gear 68. The rotational amount of the rewind planet carrier 83 is controlled by adjusting the position of the rewind control lever 82 as shown in FIG. 14. The rewind planet carrier 83 thereby brings a rewind planet gear 85 to engage and disengage a cartridge-related driving cam 86, the fork gear 25, or a film feed-out gear 87, thereby connecting and disconnecting the driving force of the motor 61 thereto. Stoppers 88 and 89 are provided in the selecting mechanism 67 for controlling rotational amount of the rewind planet carrier 83 where the rewind control lever 82 cannot act on the rewind planet carrier 83.

Rotation of the motor 61 can be selectably transmitted to any of the driven members by operations of the selecting mechanisms 64, 67 as described above. The take-up spool 35, the idler gear 76, and the release charge cam 78 are the driven members in the selecting mechanism 64, and the fork gear 25, the cartridge-related driving cam 86, and the film feed-out gear 87 are the driven members in the selecting mechanism 67, each member carrying out its assigned operations when driven. As mentioned above, these operations are driven by rotating the motor 61 in the reverse direction. The reverse rotation of the motor is transmitted to each planet gear, i.e., the take-up planet gear 74, the release charge planet gear 75, or the rewind planet gear 85, supported by the then stationary take-up planet carriers 72, 73 and the rewind planet carrier 83, respectively. In the selecting mechanism 67, the position of the rewind control lever 82 is first controlled by the selecting mechanism 64 by the rotation of the motor in the normal direction in order to define a desired selected condition in the selecting mechanism 67. Then, the rewind planet gear carrier 83 is rotated with the rewind sun gear 84 in the initial rotation when the motor 61 is rotated in the reverse direction, until the rewind planet gear carrier 83 is stopped by the rewind control lever 82 at the predetermined position, where the rewind planet gear 85 transmits the rotation to a selected driven member. It is to be noted that all gears mentioned above are not limited to toothed gears, and friction wheels may also be employed for selecting and driving operations. The present invention generally defines such members as rotating members.

Figure 16:
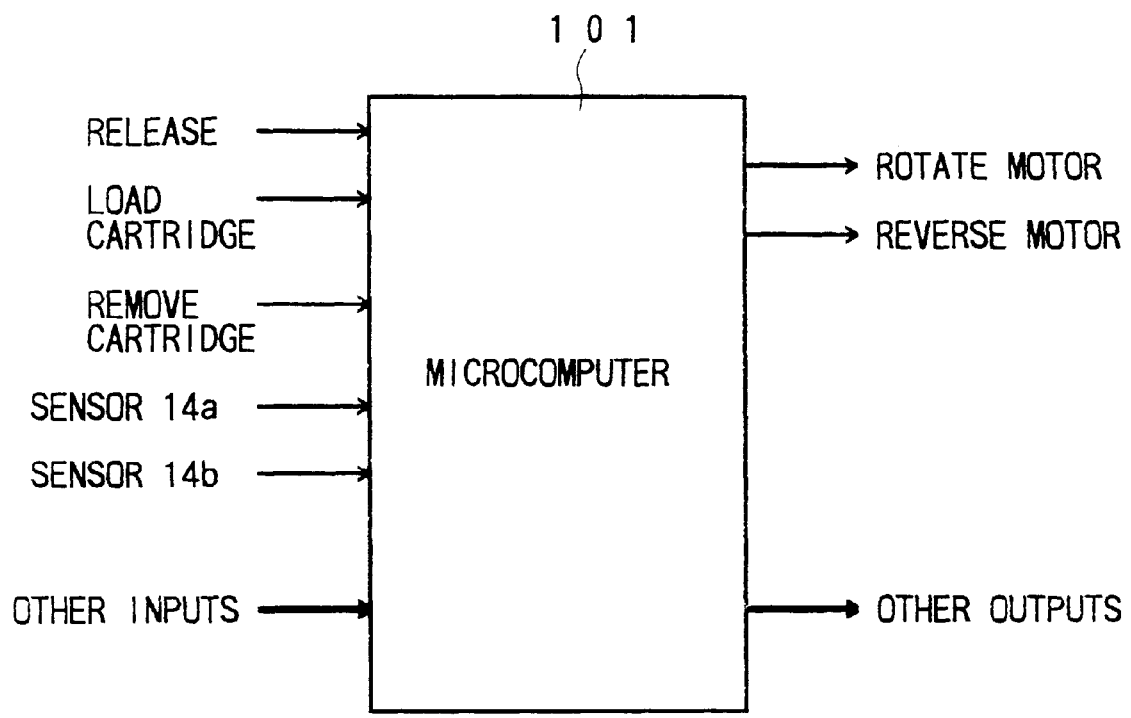
FIG. 16 is a block diagram showing a typical input-output relation in a microcomputer for controlling operations of a camera according to an embodiment of the present invention.

A microcomputer 101 shown in FIG. 16 or any other controlling means is used for these selecting and operation controls. This is preferably made by a single microcomputer which also controls functions and operations of the camera. The microcomputer 101 outputs signals to rotate or reverse motor 61 to perform necessary sequential operations in a predetermined order or at a predetermined timing according to various kinds of inputs including a shutter release signal accompanying the operation of the release button 10, a cartridge loaded signal detected by a microswitch, a cartridge removed signal after finishing photographing or after the film 9 is all exposed, or read-out signals from the photo sensors 14a, 14b, as shown in FIG. 16.

Film winding operation is performed as follows. The take-up sun gear 65 rotates clockwise by the reverse rotation of the motor 61, rotating the take-up planet gear 74 counterclockwise. The take-up spool 35 engaging the opposing take-up planet gear 74 is thus driven to rotate clockwise, thereby taking up the film 9. Other planet gears are idling in the meantime.

Release charge and vertical movements of the mirror are carried out as follows. Take-up sun gear 65 rotates clockwise by the reversing motor 61, rotating the release charge planet gear 75 counterclockwise. The release charge cam 78 is thus driven to rotate clockwise by the opposing release charge planet gear 75, while other planet gears are idling.

To perform cartridge-related operations, the rewind sun gear 84 is driven to rotate counterclockwise through the idler gear 68 by the reversing motor 61. The rewind planet carrier 83 pivoting with the rewind sun gear 84 is stopped by the rewind control lever 82 where the rewind planet gear 85 comes to engage the cartridge-related cam 86. The cartridge-related cam 86 is thus rotated counterclockwise by engaging the rewind planet gear 85 driven to rotate clockwise by the rewind sun gear 84. Other planet gears are meanwhile idling.

To rewind the film 9 into the film cartridge 5, the rewind sun gear 84 is driven to rotate counterclockwise through the idler gear 68 by the reversing motor 61. The rewind planet carrier 83 pivoting with the rewind sun gear 84 is stopped by the rewind control lever 82 where the rewind planet gear 85 comes to engage the fork gear 25. While other gears are idling, the fork gear 25 is driven to rotate counterclockwise by engaging the rewind planet gear 85 driven to rotate clockwise by the rewind sun gear 84.

To feed out the film 9, the rewind sun gear 84 is driven to rotate counterclockwise through the idler gear 68 by the reversing motor 61. The rewind planet carrier 83 pivoting with the rewind sun gear 84 is brought to a halt by the stopper 89 where the rewind planet gear 85 comes to engage the film feed-out gear 87. The rewind planet gear 85 driven to rotate clockwise by the rewind sun gear 84 rotates the engaging film feed-out gear 87 counterclockwise. And the film feed-out gear 87 rotates the opposing fork gear 25 clockwise. At the same time, in the selecting mechanism 64 at the film take-up side, the take-up planet gear 74 is engaged with the take-up spool 35. Clockwise rotation of the take-up sun gear 65 driven by the reversing motor 61 is transmitted to the take-up spool 35 through the take-up planet gear 74. The take-up spool 35 driven to rotate clockwise winds up the film 9 being fed out thereto and performs film take-up operation each time the shutter is released.

Since the film 9 is reeled out and rewound only by switching the rotation of the fork gear 25 in opposite directions, provision and disposition of the gear train may be variously arranged other than the one shown in FIGS. 12 and 14, for example by inserting an odd number of gears between the fork gear 25 and the film feed-out gear 87. The load required to feed out the film is generally larger than that required to rewind the film. Thus, a reduction system may be preferable formed by these additional gears between the film feed-out gear 87 and the fork gear 25, so that the rewinding operation will not be undesirably delayed by the load needed for feeding out the film 9.

The drive system 27 may be variously constructed other than as described above. For example, the driven members should not necessarily be rotating members such as a gear as described in this embodiment, and other members which can slide or swing may be applied instead of rotating members. Also, various other conventional structures for the drive transmission may be employed.

FIG. 14A shows a status of the selecting mechanism 67 in which the planet control cam 77 as shown in FIGS. 12 and 13 is being driven. FIG. 14B shows a status of the selecting mechanism 67 when the film 9 is taken up, the shutter is released or charged, or the mirror is moved upward or downward by the selecting mechanism 64. FIG. 14C shows a status of the selecting mechanism 67 in which the cartridge related cam 86 is being driven. FIG. 14D shows a status of the selecting mechanism 67 during the rewinding operation. FIG. 14E shows a status of the selecting mechanism 67 during the film feed out operation.

FIG. 15 shows the changes in each cam face radius of the upper and lower cams 77a and 77b of the planet control cam 77, and how each rotational position of the cams 77a and 77b is related to the corresponding camera operation of this embodiment.

Figure 17:
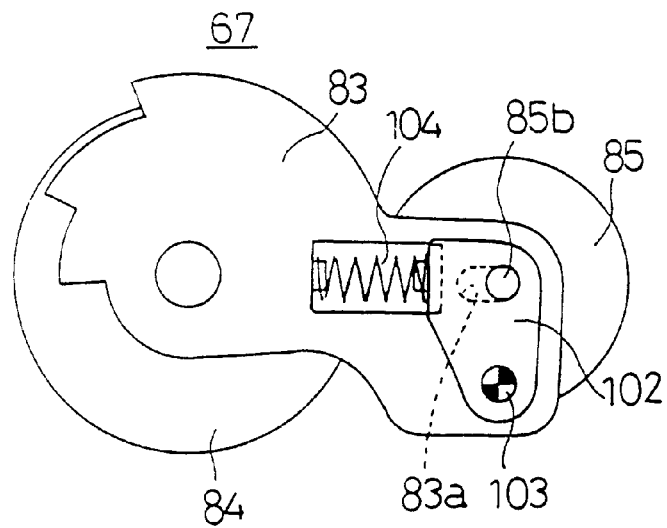
FIG. 17 is a plan view of a first embodiment of a planetary mechanism according to the present invention.

The present invention employs a planetary mechanism for drive transmission control. Preferred embodiments of the planetary mechanism of the present invention will be hereinafter described. FIG. 17 shows an enlarged view of the selecting mechanism 67 shown in FIGS. 12 and 14. The surrounding components are not shown, and the descriptions of parts overlapping those in FIGS. 12 and 14 will be omitted.

As shown in FIG. 17, the selecting mechanism 67 is a planetary mechanism in which the sun gear 84 meshes with the planet gear 85 revolving around the sun gear 84 and supported by the planet carrier 83 coaxially provided on the sun gear 84. A lever 102 supporting the planet gear 85 is provided on the planet carrier 83 which is pivotally supported by a shaft 103 to swing in the radial direction with respect to the sun gear 84. The planet gear 85 has its axis 85b supported through an oblong aperture 83a of the planet carrier 83. Further, the lever 102 is provided with a spring 104 urging the planet gear 85 away from the sun gear 84. This configuration allows the planet gear 85 to move away from the sun gear 84 urged by the spring 104, the swingable lever 102 on the planet carrier 83 coaxially provided to the sun gear 84 ensuring a stable movement of the planet gear 85. Thus, when both addenda of the planet gear 85 and any of the driven gears block each other at a beginning stage of engagement, the planet gear 85 moves away from the sun gear 84 providing a play therebetween for the planet gear 85 to retract to easily escape from the stuck condition.

Figure 18:
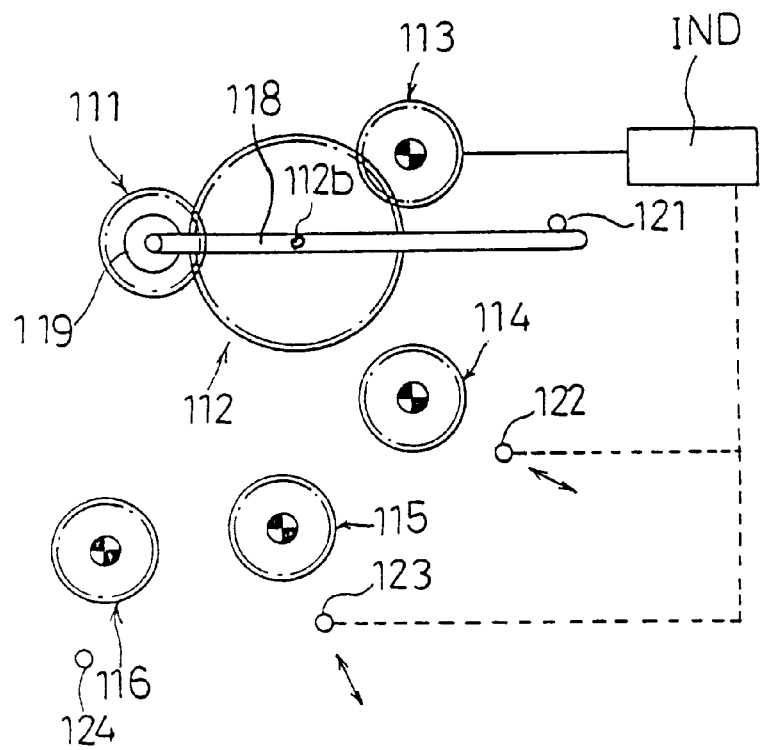
FIG. 18 is a plan view of a sequential operating mechanism in a camera to which a second embodiment of a planetary mechanism of the present invention is applied.

FIG. 18 shows a second embodiment of the planetary mechanism of the present invention. In a planetary mechanism shown in FIG. 18, a sun gear 111 meshes with a planet gear 112 revolving around the sun gear 111 and selectably engages and drives any of four driven gears 113, 114, 115, 116 at a predetermined position. A planet carrier 118 is coaxially disposed to the sun gear 111, a friction member 119 provided therebetween The planet gear 112 is supported by its axis 112a on the planet carrier 113. The friction member 119 will function likewise if provided between the planet carrier 118 and the planet gear 112.

When the motor (not shown) rotates in the normal direction, the sun gear 111 rotates counterclockwise. The planet carrier 118 attempts to pivot with the sun gear 111 in the same counterclockwise direction by the function of the friction member 119, but is stopped by a stopper 121 at a position shown in FIG. 18, where the planet gear 112 meshes with a driven gear 113. At this position, the rotation of the sun gear 111 in the counterclockwise direction is transmitted to the driven gear 113 through the rotation of the engaging planet gear 112. An indexing mechanism IND as a load connected to the driven gear 113 is thereby advanced.

When it is desired to select and drive a load connected to the driven gear 114, the indexing mechanism IND is first advanced by the rotation of the motor in the normal direction to select the next pivotal position of the planet carrier 118 to be the position of the stopper 122, and the motor is stopped. At this time, the stopper 122 for stopping the planet carrier 118 at the selected position is entered within the orbit of the planet carrier 118 by the indexing mechanism IND and waiting there. Then, when the motor is driven to rotate in the reverse direction, the sun gear 111 rotates clockwise and the planet carrier 118 pivots clockwise by the friction function of the friction member 119 until the planet carrier 118 contacts with the stopper 122 and is stopped. The planet gear 112 meshes with the driven gear 114 at this position and rotates counterclockwise by the clockwise rotation of the sun gear 111, thus driving the driven gear 114 to rotate in the clockwise direction. The load connected to the driven gear 114 is thereby driven to perform predetermined operations.

Next, the operation of driving the driven gear 115 will be described. The motor is rotated in the normal direction to release the engagement between the planet gear 112 and the driven gear 114. The sun gear 111 rotates counterclockwise to pivot the planet carrier 118 counterclockwise by the frictional force until the carrier 118 contacts with the stopper 121 and is stopped, where the planet gear 112 meshes again with the driven gear 113. The motor continues to rotate in the normal direction to drive to rotate the driven gear 113 counterclockwise and to further advance the indexing mechanism IND. The indexing mechanism IND releases the planet gear 112 from its former rotational position by advancing and selects the next rotational position to be the position of the stopper 123. The stopper 122 is thereby retreated by the indexing mechanism IND to a position where it does not block the rotation of the planet carrier 118, while the stopper 123 is entered within the orbit of the planet carrier 118 and waits there. When the motor is reversely rotated in this state, the planet carrier 118 pivots clockwise releasing the planet gear 112 from the driven gear 113 and passing through the position of the driven gear 114 until the planet carrier 118 contacts with the stopper 123 and is stopped, where the planet gear 112 meshes with the driven gear 115 transmitting the rotation of the sun gear 111 and rotating the driven gear 115 clockwise. The load system connected to the driven gear 115 is thus driven to perform predetermined operations.

Here, the planet gear 112 passes by the driven gear 114 during the clockwise pivot of the planet carrier 118. When the driving load of the load system connected to the driven gear 114 in its reverse direction is small, the driven gear 114 is slightly rotated counterclockwise by engagement between the driven gear 14 and the planet gear 112. When the driving load is large, the driven gear 114 stays stationary while the planet gear 112 rotates counterclockwise when contacted with the driven gear 114 and continues revolving clockwise with the pivoting planet carrier 118 by the function of the friction member 119.

When the drive of the load system connected to the driven gear 115 completes and the next operation is desired to be executed, the motor is driven to rotate in the normal direction which makes the sun gear 111 rotate counterclockwise.

The planet carrier 118 is released from the stopper 123, removing the planet gear 112 from the driven gear 115, and is pivoted counterclockwise until it is stopped by the stopper 121, passing the driven gear 114 on its way thereto. The planet gear 112 meshes again with the driven gear 113, and by further rotating the sun gear 111 counterclockwise, the indexing mechanism IND is advanced to select the position of the stopper 124 corresponding to the next rotational position. The planet gear 112 temporarily engages the driven gear 114 on its way to pivot counterclockwise and passes therethrough likewise as described above except that the driven gear 114 is slightly rotated clockwise when the driving load of the load system connected to the driven gear 114 is small. When the next rotational position is selected, the stoppers 122 and 123 are retracted outside the orbit of the planet carrier 118. The motor is then reversed, rotating the sun gear 111 and pivoting the planet carrier 118 both clockwise. The planet gear 112, after being released from the driven gear 113, passes by the driven gears 114, 115 and goes on revolving until the planet carrier 118 is blocked by the stopper 124. The planet gear 112 thereby meshes with the driven gear 116, and the rotation of the motor in the reverse direction, i.e., the clockwise rotation of the sun gear 111 is transmitted to the driven gear 116 through the planet gear 112. The load system connected to the driven gear 116 is then driven to perform predetermined operations. To disconnect the drive from the load system connected to the driven gear 116, the motor only needs to be rotated in the normal direction.

Figure 31A:
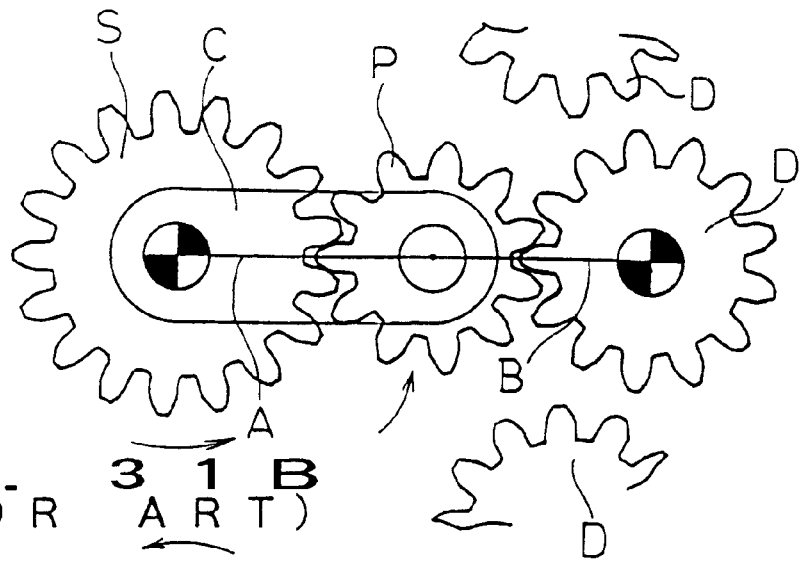
FIGS. 31A, 31B, 31C are theoretical diagrams of a conventional planetary mechanism in its operating condition.
Figure 31B:
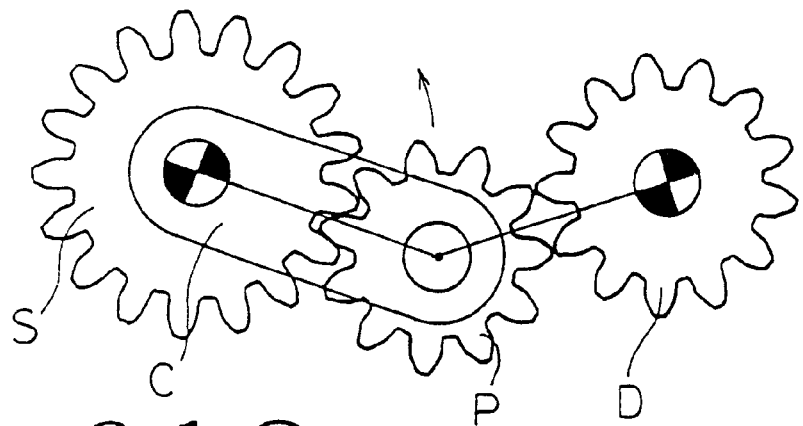
Figure 31C:
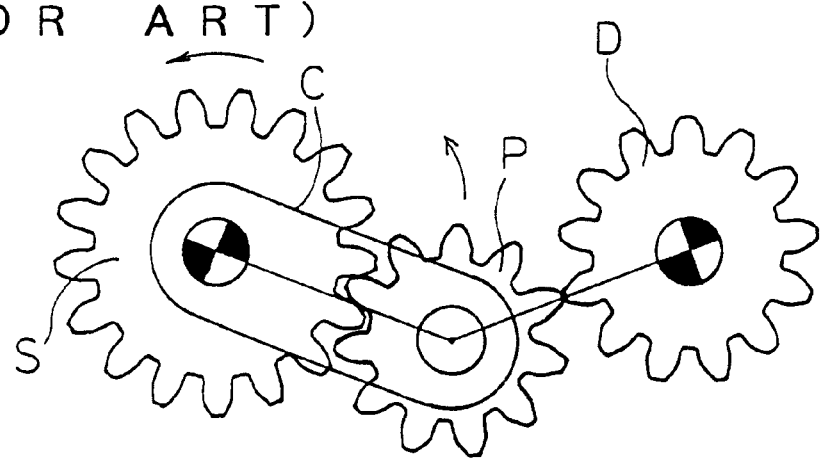

The addenda of the planet gear 112 and a driven gear to catch each other at the point where both gears come to engagement as shown in FIGS. 31B and 31C, especially where the driven gear is placed in line with the sun gear 111 and the planet gear 112, causing a malfunction or damages to the supporting shafts or the addenda of the gears. To prevent such malfunctions, a second embodiment of the planetary mechanism according to the present invention has the following improvements.

Figure 19:
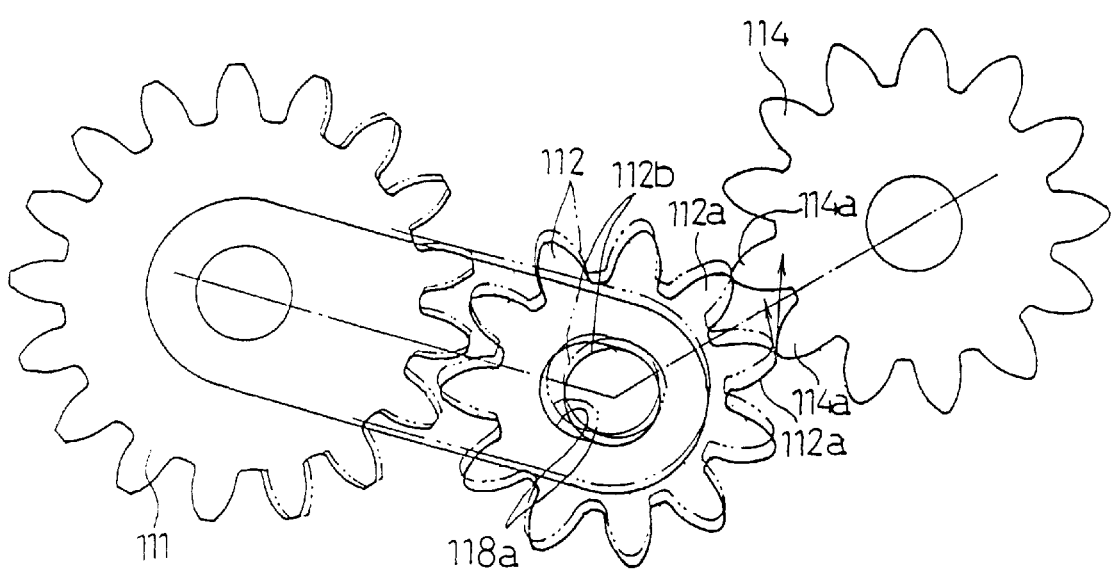
FIG. 19 is a theoretical diagram explaining a function of a second embodiment of a planetary mechanism according to the present invention.
Figure 20:
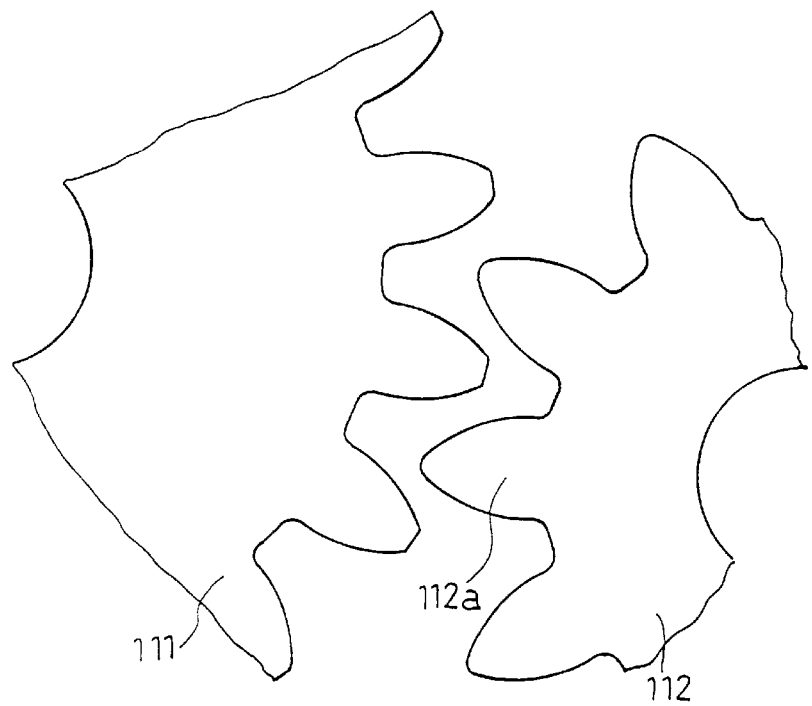
FIG. 20 is an explanatory diagram showing a sun gear and a planet gear of FIG. 19 meshing with each other.

Referring now to FIG. 19, the planet gear 112 has its shaft 112b supported in an ellipsoidal aperture 118a of the planet carrier 118 so that the distance between both shafts the sun gear 111 and the planet gear 112 is changeable in order to prevent the teeth of the planet gear 112 and the driven gears 113–116 from catching and blocking each other. To make the descriptions simpler, the driven gears 113, 115, and 116 are not shown. When the tips of each one or two teeth 112a, 114a of the planet gear 112 and the driven gear 114 catch each other at the time when the two gears begin to mesh with each other as shown by solid lines in FIG. 19, the planet gear 112 is blocked by the driven gear 114 and obstructed to further revolve around the sun gear 111. In an ordinary mechanism, the two gears under such condition often get stuck with each other, unable to rotate further. The planet gear 112 according to the present invention is capable of changing its position with respect to the sun gear 111 within the range in which both gears are not disengaged as shown in FIG. 20. The planet gear 112 can thus have enough space for retraction within this range using the play between the sun gear 111 and the planet gear 112 to escape from the blocked condition as shown by phantom lines in FIG. 19. The planet gear 112 can thus continue to revolve and smoothly mesh with and drive the driven gear 114. When there are provided more than 3 driven gears as in this embodiment, the planet gear 112 can readily pass by a driven gear on its revolving way, even when the sun gear 111, the planet gear 112, and the driven gear come to engage with each other in one line. Accordingly, a simple improvement to make the planet gear 112 movable solves the conventional malfunction in the mechanism, increasing reliability.

Figure 21:
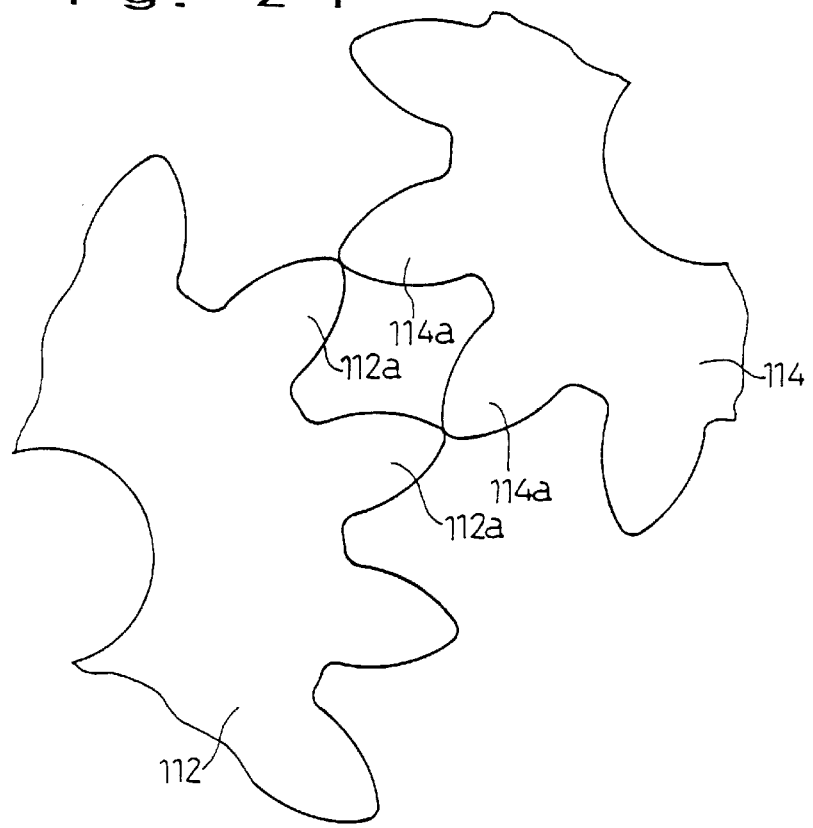
FIG. 21 is an explanatory diagram showing a planet gear and a driven gear of FIG. 19 meshing with each other.

As shown in FIGS. 19–21, the addenda 112a, 114a of the planet gear 112 and the driven gear 114 are shifted gears having pointed tips while the sun gear 111 is made in the normal form. Shifted gears do not easily catch each other and even when they do, they can be smoothly disengaged by slightly sliding each other. The stability of operation is thus enhanced thereby.

Figure 22:
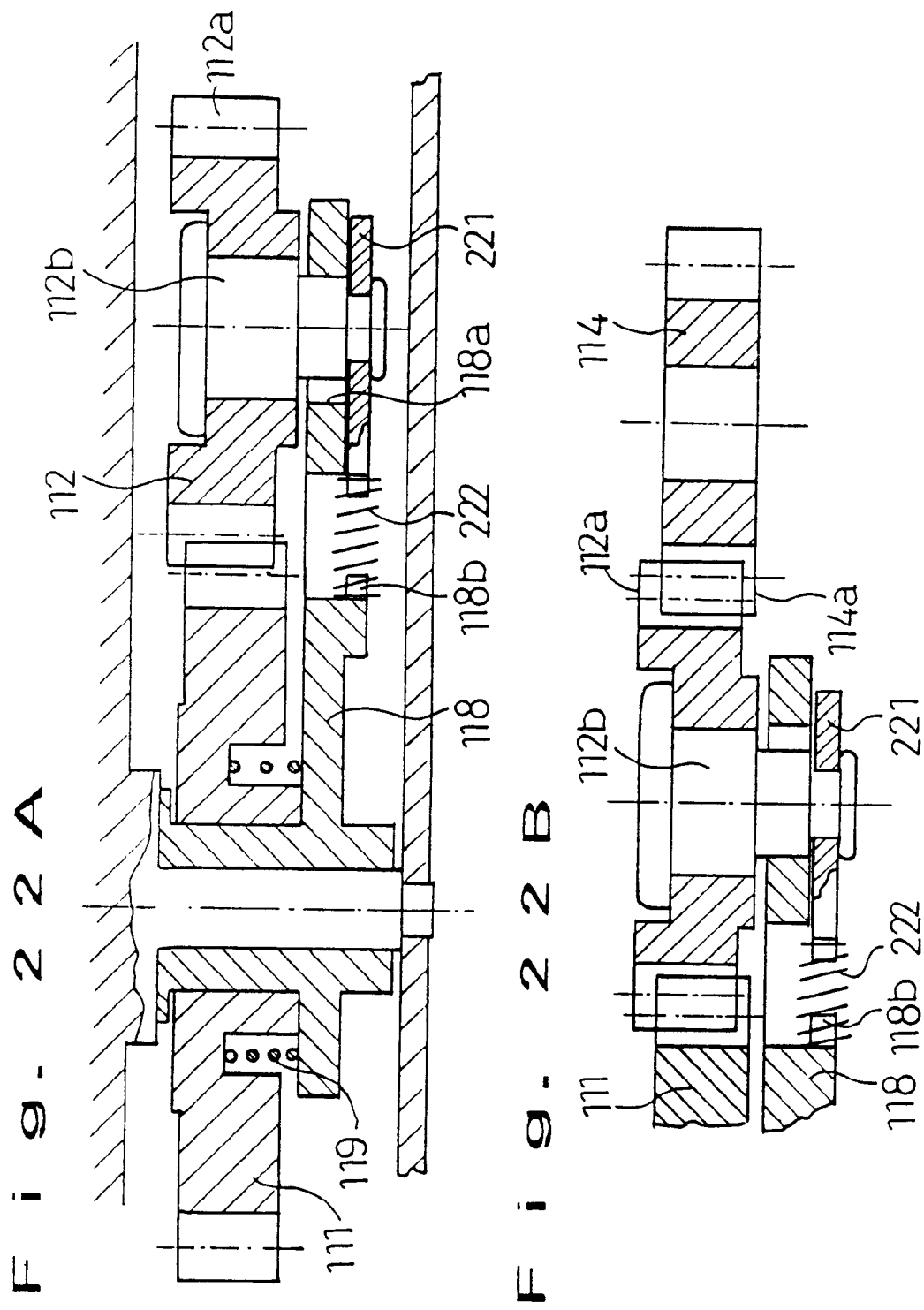
FIGS. 22A and 22B are sectional views showing a concrete example of a second embodiment of a planetary mechanism according to the present invention.

FIGS. 22A and 22B show the configuration of the second embodiment more concretely. A coil spring serving as the friction member 119 is acted between the sun gear 111 and the planet carrier 118. The planet gear 112 is attached to the shaft 112b which is received by the ellipsoidal aperture 118a formed on the planet carrier 118. The planet gear 112 is fastened by a washer 221 so as not to drop from the planet carrier 118. A coil 222 is disposed between a projection 118b formed on the planet carrier 118 and the washer 221 to urge the planet gear 112 away from the sun gear 111 along the oblong aperture 118b.

As described above, while the present invention employs the conventional simple support structure wherein the planet gear 112 is supported by the planet carrier 118 which is coaxial with the sun gear 111, the present invention accomplishes the increase in operation stability by simply adding improvements in which the coil 222 is acted to urge the planet gear 112 in the direction away from the sun gear 111.

Such a planetary mechanism as described in this embodiment wherein the planet gear 112 selectably engages and drives one of the several driven gears 113–116 at a predetermined position along the orbit of the sun gear 111 is suitable for any sequential operations required in other devices such as a video cassette recorder or a wiper driving mechanism in a vehicle. The video cassette recorder requires plural operations such as loading a cassette, drawing out or winding a tape around a cylinder, winding and rewinding the tape, fast forwarding the tape, and ejecting the cassette. The planetary mechanism of the present invention is also suitable for executing these operations in a video cassette recorder, as it contributes to the whole construction to be made more compact and simple. Likewise, the planetary mechanism may be also employed for carrying out various operations such as drawing out and accommodating a wiper or driving the wiper at different speeds required in a wiper driving mechanism in a vehicle.

Figure 23:
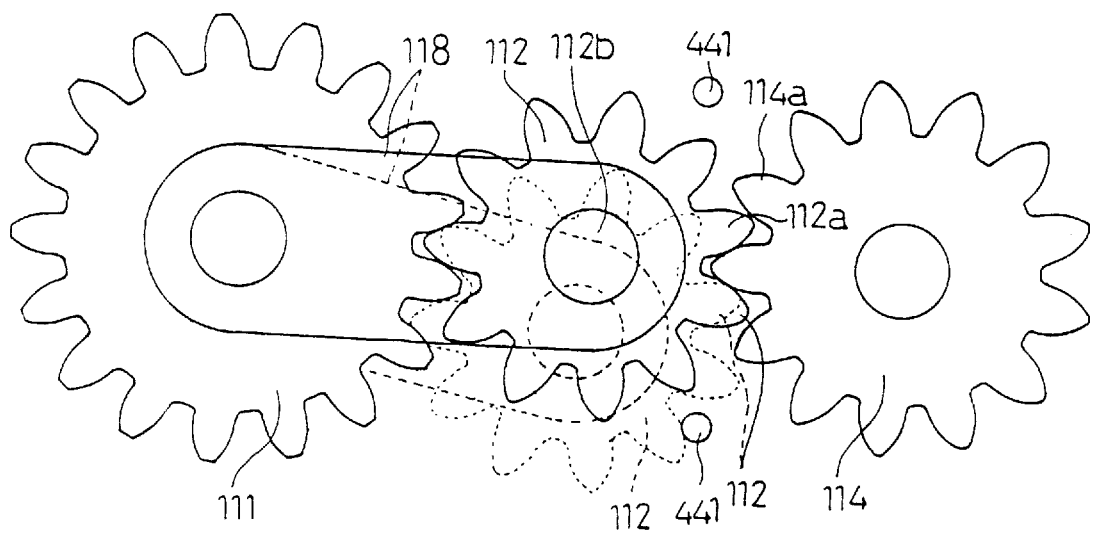
FIG. 23 is a theoretical diagram of a third embodiment of a planetary mechanism according to the present invention.
Figure 24:
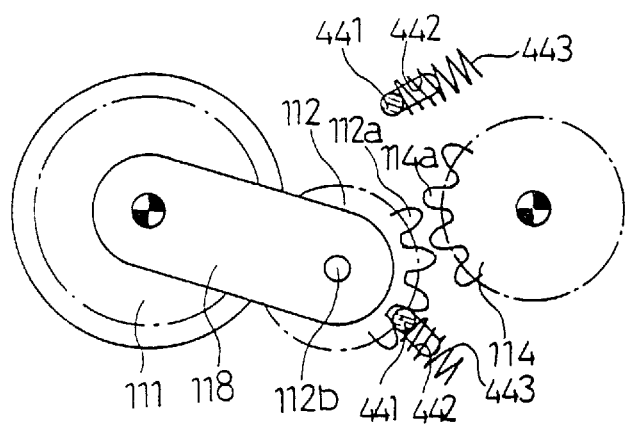
FIG. 24 is a plan view showing a concrete example of a third embodiment of a planetary mechanism according to the present invention.

FIGS. 23 and 24 show a third embodiment of the planetary mechanism according to the present invention. As in the first embodiment, the planetary mechanism of this embodiment comprises the planet gear 112 supported by the planet carrier 118 which is coaxially mounted on the sun gear 111 and an appropriate number of driven gears provided along an orbit of the planet gear 112, each at a predetermined position to engage the planet gear 112. The third embodiment differs from the first embodiment in that it is provided with an adjuster 441 for adjusting the planet gear 112 to a predetermined rotational phase by meshing therewith.

The adjuster 441 may be a single or a plurality of pin(s) as shown in FIG. 23 or a part of a gear mechanism. The planet gear 112 can selectably mesh with any one of the driven gears or release the engagement. The planet gear 112 meshes with the adjuster 441 as shown by broken lines in FIG. 23 at a position prior to its engagement with the predetermined driven gear 114, and is adjusted to its predetermined rotational phase. Thus, by setting the rotational phase of the planet gear 112 to a phase engaging with the driven gear 114 which is stationary at a certain position, the planet gear 112 meshes with the driven gear 114 smoothly as shown by solid lines in FIG. 23 via the adjuster 441. Accordingly, malfunction of operation is obviated and the reliability of the mechanism is increased by a simple configuration wherein the adjuster 441 such as a pin is added.

More concretely, the adjuster 441 is movable along a slot 442 made on a base plate (not shown) away from the planet gear 112, as well as a spring 443 is provided to urge the adjuster 441 toward the planet gear 112. Thus, even when the addenda 112a of the planet gear 112 and the adjuster 441 catch each other at the beginning of engagement, the adjuster 441 can retract from the planet gear 112 so that the planet gear 112 slips out of the stuck condition and smoothly meshes with the driven gear 114. The operation stability is thus further increased comparing to the second embodiment.

The adjuster 441 such as a pin is provided in such a way that it keeps engaging with the planet gear 112 until after the planet gear 112 begins to mesh with the driven gear 114 by its revolution. Therefore, the rotational phase of the planet gear 112 once adjusted will not be out of the adjusted phase before it engages with the driven gear 114, thereby assuring stability of the operation.

Figure 25:
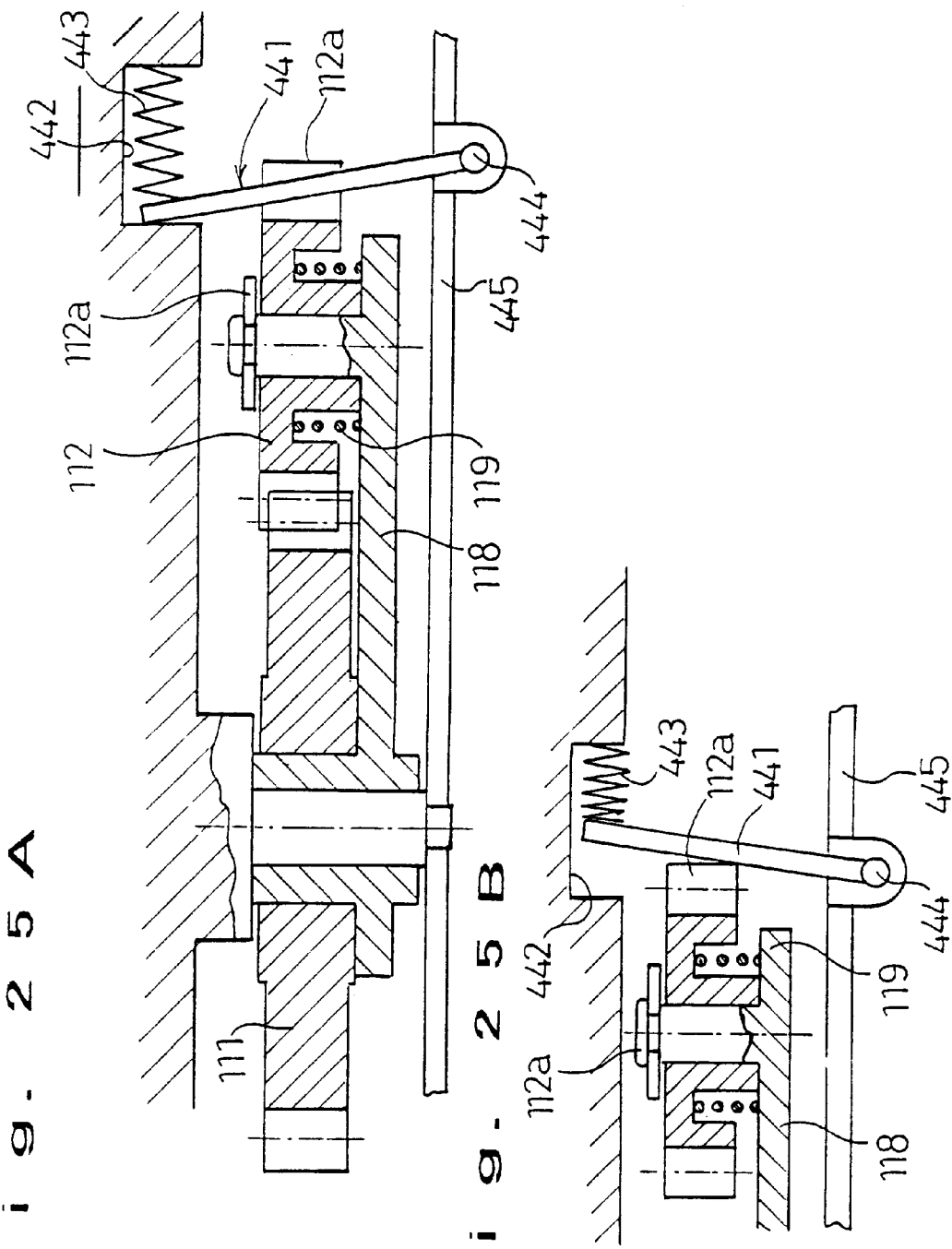
FIGS. 25A and 25B are detailed sectional views showing a third embodiment of a planetary mechanism of FIG. 24.

FIGS. 25A and 25B show a still more concrete example or the third embodiment of the planetary mechanism according to the present invention. A coil spring as the friction member 119 is provided between the planet gear 112 and the planet carrier 118. The adjuster 441 such as a pin is pivotally supported at its lower end by a shaft 444 to a plate 445. The fore end of the pin 441 is movable away from the planet gear 112 along the slot 442 by a swing motion around the shaft 444. The spring 443 is acted inside the slot 442 to urge the pin 441 toward the planet gear 112. FIG. 25A shows an adjusted condition wherein the adjuster 441 properly engages the planet gear 112 and thereby adjusts the planet gear 112 to a predetermined rotational phase. FIG. 25B shows a blocked condition in which the addenda 112a of the planet gear 112 and the adjuster 441 catch each other. The planet gear 112 can escape from the blocked condition by pushing the adjuster 441 away therefrom, and be adjusted by engaging again with the adjuster 441.

Figure 26:
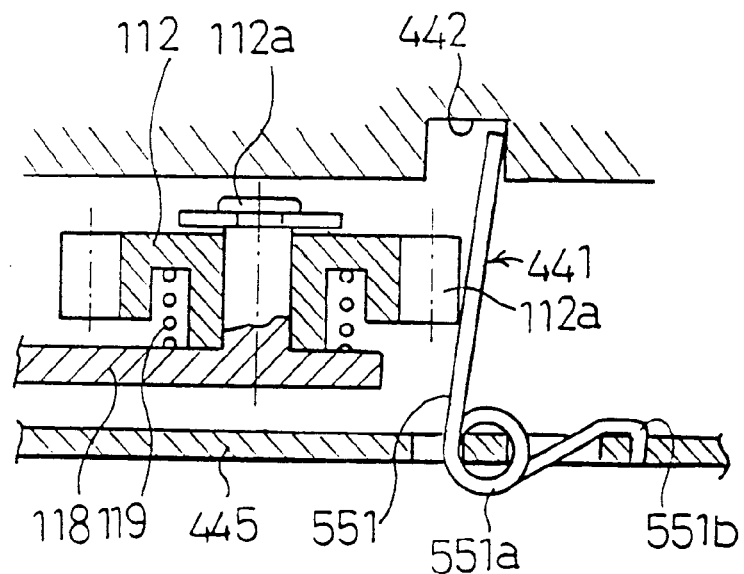
FIG. 26 is a sectional view of a fourth embodiment of a planetary mechanism according to the present invention.

FIG. 26 shows a fourth embodiment of the planetary mechanism according to the present invention. The pin-like adjuster 441 consists of one end of a helical spring 551 having a helical portion 551a supported on the plate 445. The other end 551b of the helical spring 551 is fixed to the plate 445, thereby urging the other end, i.e., the pin-like adjuster 441 toward the planet gear 112. The structure is simpler than the third embodiment as there is no need for providing an extra force exerting member to urge the adjuster 441 toward the planet gear 112.

Figure 27:
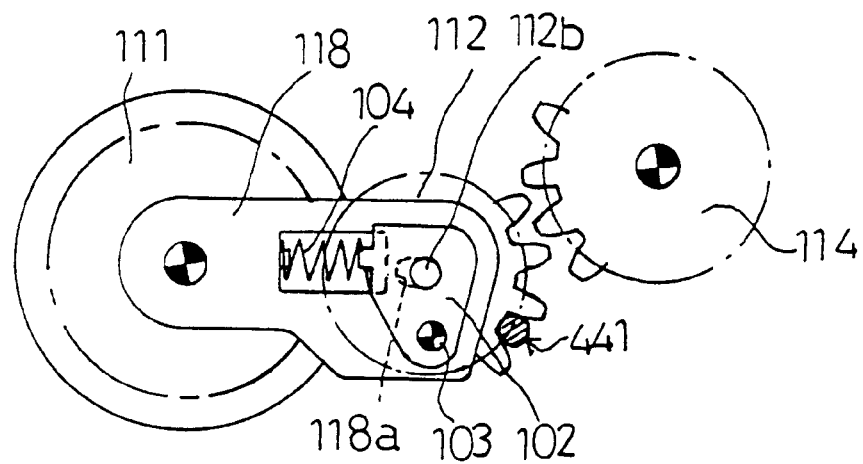
FIG. 27 is a plan view of a fifth embodiment of a planetary mechanism according to the present invention.

FIG. 27 shows a fifth embodiment of the planetary mechanism according to the present invention, which is a combination of the second and the third embodiment. The planet gear 112 engages the adjuster 441 before starting to mesh with the driven gear 114, and the rotational phase of the planet gear 112 is thereby adjusted to properly engage the driven gear 114. In case that the addenda 112a of the planet gear 112 are blocked by the adjuster 441, the planet gear 112 can move away therefrom with a swing motion by the lever 102 against the force of the spring 104, escaping from the blocked condition. The adjuster 441 thus needs not to be retractable and may be constructed as a fixed pin. For supporting the planet gear 112, the structure of the first embodiment may be also employed.

Figure 28:
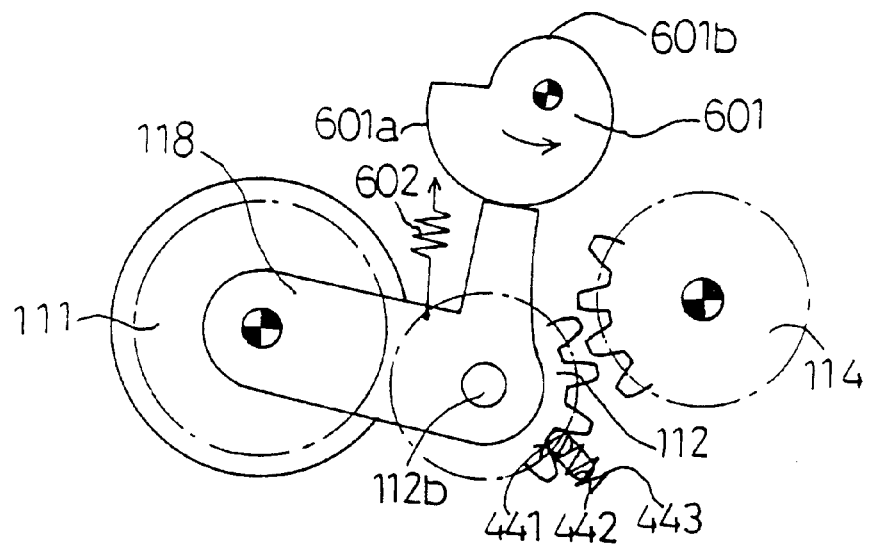
FIG. 28 is a plan view of a sixth embodiment of a planetary mechanism according to the present invention.

FIG. 28 shows a sixth embodiment of the planetary mechanism according to the present invention. The planet carrier 118 is pulled by a spring 602 toward one direction, and the position of the planet carrier 118 is changed by a planet control cam 601 against the force of the spring 602, thereby selecting a driven gear to mesh with. Although the adjuster 441 of the third embodiment is employed, it may be replaced by that of the fourth embodiment, or the configuration of the first or the second embodiment in which the planet gear 112 is movably supported. The planet carrier control cam 601 has contact surfaces 601a, 601b with different radii and changes the position of the planet carrier 118 by rotating and contacting either surface thereof with the planet carrier 118.

Figure 29:
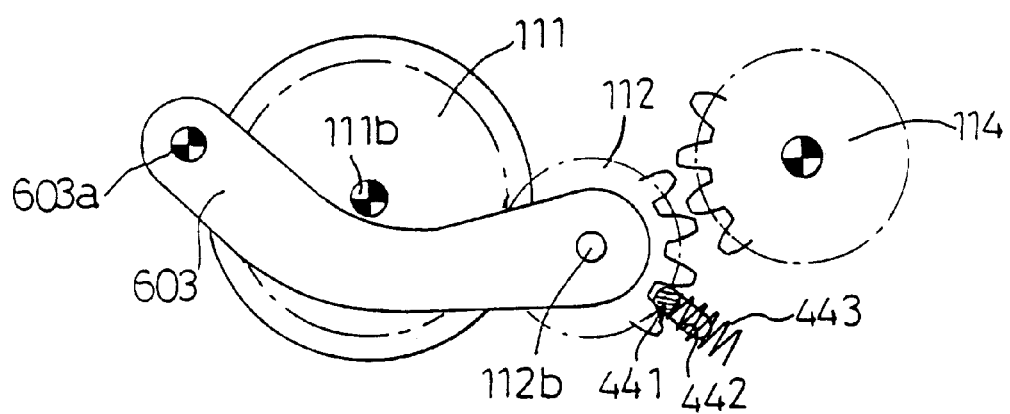
FIG. 29 is a plan view of a seventh embodiment of a planetary mechanism according to the present invention.

FIG. 29 shows a seventh embodiment of the planetary mechanism according to the present invention. The planet gear 112 is selectably engaged with a driven gear by swinging a lever 603 supported around a shaft 603a which is independently provided. Although the adjuster 441 of the third embodiment is employed, it may be replaced by that of the fourth embodiment, or the configuration of the first or the second embodiment in which the planet gear 112 is movably supported.

Figure 30:
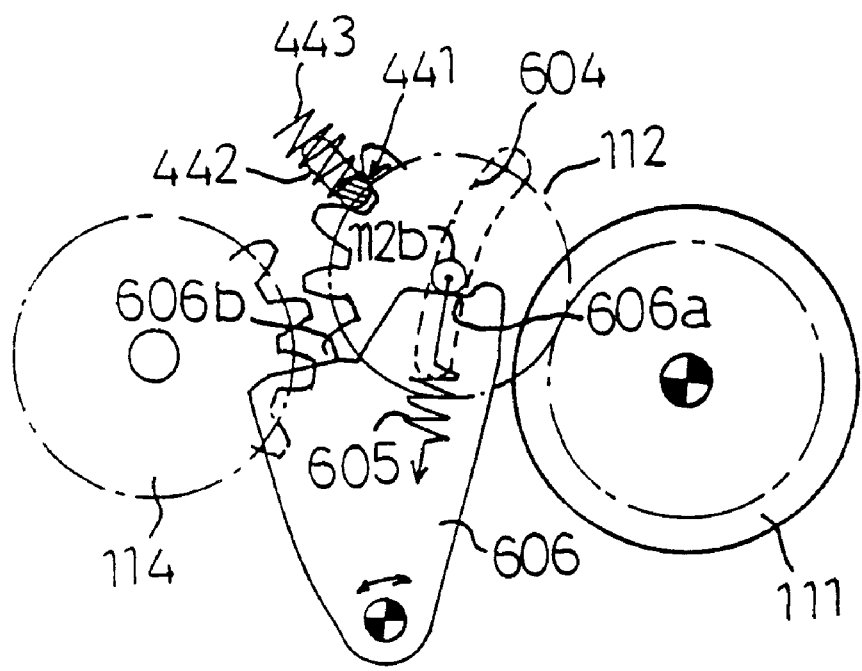
FIG. 30 is a plan view of a eighth embodiment of a planetary mechanism according to the present invention.

FIG. 30 shows an eighth embodiment of the planetary mechanism according to the present invention. The planet gear 112 is not supported by the planet carrier in this embodiment, and instead pulled by a spring 605 toward one direction. The shaft 112b of the planet gear 112 is guided by a slot 604 provided on a base plate (not shown). A planet gear control cam 606 has several contact surfaces 606a, 606b to contact with the shaft 112b of the planet gear 112, and changes the position of the planet gear 112 to selectably mesh with a driven gear. Although the adjuster 441 of the third embodiment is employed, it may be replaced by that of the fourth embodiment, or the configuration of the first or the second embodiment in which the planet gear 112 is movably supported.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

We claim:

1. A gear mechanism, comprising:
   a sun gear driven to rotate;
   a planet gear rotating and revolving around the sun gear by rotation of the sun gear;
   a driven gear provided along an orbit of the planet gear and driven to rotate by the rotating planet gear when the planet gear stops at a position opposing to the driven gear where the planet gear engages the driven gear along the orbit of the planet gear; and
   a supporting member for supporting the planet gear such that the distance between axes of the planet gear and the sun gear can be changed.

2. A gear mechanism according to claim 1, further comprising a force exerting member for moving the planet gear away from the sun gear.

3. A gear mechanism according to claim 1, wherein the supporting member includes a carrier provided coaxially with the sun gear for supporting the planet gear.

4. The gear mechanism of claim 1, further comprising an adjuster for adjusting the planet gear to a predetermined rotational phase by meshing with the planet gear.

5. The gear mechanism of claim 4, wherein the adjuster comprises at least one pin.

6. The gear mechanism of claim 5, wherein the adjuster comprises a part of a gear mechanism.

7. The gear mechanism of claim 5, wherein the adjuster engages with the planet gear until after the planet gear begins to mesh with the driven gear.

8. The gear mechanism of claim 5, further comprising a planet gear shaft and a control cam which contacts the planet gear shaft to change the position of the planet gear to selectively mesh with the driven gear.

9. The gear mechanism of claim 1, wherein the planet gear is capable of translating in a linear direction.

10. The gear mechanism of claim 9, wherein the linear direction is towards the sun gear.

11. The gear mechanism of claim 1, where a space defined between the supporting member and the planet gear enables the distance between the axes of the planet gear and the sun gear to change.

12. The gear mechanism of claim 11, wherein the space is between an inner surface defined by an aperture through the supporting member, and a shaft of the planet gear extending in said aperture.

13. A gear mechanism, comprising:

a sun gear driven to rotate:

a planet gear rotating and revolving around the sun gear by rotation of the sun gear;

a driven gear provided along an orbit of the planet gear and driven to rotate by the rotating planet gear when the planet gear stops at a position opposing to the driven gear where the planet gear engages the driven gear along the orbit of the planet gear; and an adjusting member provided upstream of the driven gear along the orbit of the planet gear for adjusting a rotational phase of the planet gear to a predetermined phase by meshing with the planet gear before the planet gear engages the driven gear.

14. A gear mechanism according to claim 13, wherein the adjusting member includes a pin.

15. A gear mechanism according to claim 14, wherein the pin is supported such that the pin can advance and retract with respect to the planet gear, and can be pressed in a direction toward the planet gear.

16. A gear mechanism, comprising:

a sun gear driven to rotate;

a planet gear rotating and revolving around the sun gear by rotation of the sun gear;

a driven gear provided along an orbit of the planet gear and driven to rotate by the rotating planet gear when the planet gear stops at a position opposing to the driven gear where the planet gear engages the driven gear along the orbit of the planet gear; and a supporting member having a singular unified body for supporting the planet gear that the distance between axes of the planet gear and the sun gear can be changed.

17. The gear mechanism of claim 16, wherein the singular unified body includes an ellipsoidal aperture.

18. The gear mechanism of claim 16, wherein the planet gear is capable of translating in a linear direction.

19. The gear mechanism of claim 18, wherein the linear direction is towards the sun gear.

20. The gear mechanism of claim 16, where a space defined between the supporting member and the planet gear enables the distance between the axes of the planet gear and the sun gear to change.

21. The gear mechanism of claim 20, wherein the space is between an inner surface defined by an aperture through the supporting member, and a shaft of the planet gear extending in said aperture.

* * * * *

UNITED STATES PATENT AND TRADEMARK OFFICE
CERTIFICATE OF CORRECTION

PATENT NO.  : 6,086,503
DATED       : July 11, 2000
INVENTOR(S) : Yoshito KONISHI, et al.

It is certified that error appears in the above-identified patent and that said Letter Patent is hereby corrected as shown below:

On the Title page:

Section [75], under the inventors, delete "Nobuharu Murashima, Nara".

Signed and Sealed this

First Day of May, 2001

Attest:

NICHOLAS P. GODICI

Attesting Officer

Acting Director of the United States Patent and Trademark Office